(12) United States Patent
MacFaden

(10) Patent No.: US 11,073,860 B2
(45) Date of Patent: Jul. 27, 2021

(54) OPTICAL SYSTEM FOR PERFORMING COMPLEX FOURIER TRANSFORMS

(71) Applicant: CAMBRIDGE ENTERPRISE LIMITED, Cambridge (GB)

(72) Inventor: Alexander Joseph MacFaden, Cheltenham (GB)

(73) Assignee: Cambridge Enterprise Limited

(*) Notice: Subject to any disclaimer, the term of this patent is extended or adjusted under 35 U.S.C. 154(b) by 379 days.

(21) Appl. No.: 15/938,994

(22) Filed: Mar. 28, 2018

(65) Prior Publication Data
US 2018/0217629 A1    Aug. 2, 2018

Related U.S. Application Data

(63) Continuation-in-part of application No. PCT/GB2016/053015, filed on Sep. 28, 2016.

(30) Foreign Application Priority Data

Sep. 28, 2015   (GB) .................................... 1517076

(51) Int. Cl.
*G06E 3/00*     (2006.01)
*G06F 17/14*    (2006.01)

(52) U.S. Cl.
CPC ............. *G06E 3/003* (2013.01); *G06E 3/005* (2013.01); *G06F 17/141* (2013.01)

(58) Field of Classification Search
CPC ....... G06E 3/003; G06E 3/005; G06F 17/141; G06F 17/14
See application file for complete search history.

(56) References Cited

U.S. PATENT DOCUMENTS 5,416,618 A * 5/1995 Juday ........................ G02F 3/00
                                                               349/1
6,421,163 B1 * 7/2002 Culver ................... G02B 27/46
                                                              359/237

(Continued)

FOREIGN PATENT DOCUMENTS

EP    2503379       9/2012
JP    2003530564    10/2003

OTHER PUBLICATIONS

Robert A. Gonsalves, "Small-phase solution to the phase-retrieval problem", Optics Letters, vol. 26, No. 10, May 15, 2001, pp. 684-685.

(Continued)

*Primary Examiner* — Kimberly N. Kakalec
(74) *Attorney, Agent, or Firm* — Jetter & Associates, P.A.; Neil R. Jetter

(57) ABSTRACT

A method of performing a complex Fourier transform of an input function including amplitude and phase information, including decomposing the input function into a plurality of sub-functions, wherein the Fourier transform of each sub-function includes an amplitude function and a phase function in which the phase is constrained to a plurality of possible phase values. The phase function of the Fourier transform of each sub-function is determined with an optical system that measures the amplitude function of an optical Fourier transform of the sub-function and changes in the amplitude function of the optical Fourier transform caused by applying a perturbation function to the sub-function. The determined phase functions and the measured amplitude functions are combined for each of the sub-functions to form the complex Fourier transform of the input function.

22 Claims, 19 Drawing Sheets

(56) References Cited

U.S. PATENT DOCUMENTS

| | | | | |
|---|---|---|---|---|
| 2005/0018295 A1* | 1/2005 | Mendlovic | ............... | G06T 7/262 |
| | | | | 359/558 |
| 2006/0262403 A1* | 11/2006 | Ludwig | ................... | G06E 3/003 |
| | | | | 359/559 |
| 2007/0003145 A1* | 1/2007 | Goldenberg | ............ | G02B 27/46 |
| | | | | 382/211 |
| 2009/0052794 A1* | 2/2009 | Ludwig | ................. | G02B 27/46 |
| | | | | 382/255 |

OTHER PUBLICATIONS

Xinyang Li, et al., "Principle of a linear phase retrieval method and its application in adaptive optics system", Proc. of SPIE, vol. 7018, Advanced Optical and Mechanical Technologies in Telescopes and Instrumentation, Jul. 23, 2008, pp. 70183Y-1-70183Y-8.

Christoph U. Keller, et al., "Extremely fast focal-plane wavefront sensing for extreme adaptive optics", Proceedings of SPIE, vol. 8447, pp. 844721-1 to 844721-10, Sep. 13, 2012.

A. J. MacFaden, et al., "Characterization, design, and optimization of a two-pass twisted nematic liquid crystal spatial light modulator system for arbitrary complex modulation", Journal of the Optical Society of America A, vol. 34, No. 2, Feb. 2017, pp. 161-170.

* cited by examiner

OPTICAL SYSTEM FOR PERFORMING COMPLEX FOURIER TRANSFORMS

CROSS REFERENCE TO RELATED APPLICATIONS

This application is a continuation-in-part (CIP) application of PCT application number PCT/GB2016/053015 filed on Sep. 28, 2016, that claims the benefit of UK Application number GB20150017076 filed on Sep. 28, 2015, which are both herein incorporated by reference in their entirety.

FIELD

This Disclosure relates to optical devices configured to perform a complex Fourier transform of an input function.

BACKGROUND

The Fourier Transform is a ubiquitously useful mathematical operation. The Fourier Transform (FT) is used in many different computational applications, generally implemented through a Fast Fourier Transform (FFT) algorithm. Such algorithms scale as O(n·log n) with the size of the transform, n. Performing the FFT is computationally intensive and often represents a system performance bottleneck. Memory bandwidth is a limitation. In 2015, an 8K×8K FFT takes about 0.6 s on a fast computer using a high performance graphics card. Performing larger FFTs faster is highly desirable for many applications.

Fourier transforms may be carried out optically. The 2D Fourier transform occurs naturally in coherent optics. An optical co-processor could be used instead of an FFT algorithm to find the optical Fourier transform (OFT) with significant performance advantages. This represents a true FT, where the complex result is expressed in the complex amplitude of the resulting light field (i.e. magnitude and phase). However, when performing an optical Fourier transform of a complex function, most conventional methods are only capable of detecting its amplitude only and its phase information is lost, for example cameras detect |amplitude|$^2$. Therefore, information needed for describing or representing the complex Fourier transform is often incomplete and the full complex to complex Fourier transform cannot be determined. Phase detectors are available, but they do not scale well, are not very accurate and are mechanically and/or optically complex.

The Optical Fourier Transform arises naturally in a 2f optical system. FIG. 1 shows the layout of a known Optical Fourier Transform (OFT) stage. A spatial light modulator (SLM) 101, a Fourier transform lens 103 and a photodetector array 105 are arranged sequentially along a common optical axis. The SLM 101 is arranged to receive coherent, collimated light 102 from a source (not shown). The Fourier transform lens 103 is positioned at a distance f along the common optical axis from the SLM 101 and is arranged to receive spatially modulated light 104 from the SLM. The camera sensor 105 is positioned at a distance f along the common optical axis from the Fourier transform lens 103 and is arranged to receive converging light 106 from the Fourier transform lens 103.

It may be understood that if the input light is not collimated, distances may be calculated for the sensor, lens, and camera such that the Fourier transform still appears. That is, the relative positions of the SLM 101, the Fourier transform lens 103 and the camera sensor 105 may be determined such that the Fourier transform of an image displayed on the SLM 101 is captured by the camera sensor 105.

In operation, the SLM 101 is driven by a computer to "display" a numerical function $t_{input}(x,y)$, where x and y are spatial coordinates. The SLM 101 comprises a 2D array of elements which are each arranged to spatially modulate received light. The SLM 101 may spatially modulate the phase, amplitude and/or polarisation of light. The term "display" is used herein to describe that each element of the 2D array of elements may be individually controlled or driven such that a function may be represented on the SLM 101. In this example, the 2D array of elements of the SLM 101 spatially modulate the amplitude and phase of coherent, collimated laser light 102 of wavelength λ, effectively encoding light 102 with the function $t_{input}(x,y)$. The SLM 101 may therefore be described as having a complex transmission profile $t_{input}(x, y)$. The spatially modulated light 104 is then received by the Fourier transform lens 103, which has a focal length f. This results in a Fourier transform $U_f(u,v)$ of the numerical function $At_{input}(x,y)$ forming at the rear focal plane of the Fourier transform lens 103, where u and v are spatial frequency coordinates. The photodetector array 105 is positioned at the rear focal plane of the Fourier transform lens to capture the intensity distribution of the converging light 106. The SLM 101 is of the transmissive type, where the light passes through the device, but a reflective SLM types is equally applicable. Reflective SLMs have a mirror incorporated behind the liquid crystal layer that reflects the light back through the liquid crystal and electrode layers.

If the light field at one focal point of a lens is collimated and has an amplitude A modulated by a complex function input, the light field at the second focal point is given by:

$$U_f(u,v) = (e^{jkf}/j\lambda z) F\{At_{input}(x,y)\} \quad (1)$$

where $e^{jkf}/j\lambda z$ is a global term which can in general be neglected. The Fourier transform F has arisen optically.

Such a system can be used as a 'co-processor' to implement an optical Fourier transform. The input to such a system is the SLM 101, for example, a liquid crystal, micromechanical, or solid state device. The output is the photodetector array 105, for example, a camera sensor which samples the optical Fourier transform at a given resolution, which should be appropriate to the input resolution and the optical scaling of the system.

SUMMARY

This Summary is provided to introduce a brief selection of disclosed concepts in a simplified form that are further described below in the Detailed Description including the drawings provided. This Summary is not intended to limit the claimed subject matter's scope. Aspects of an invention are defined in the appended independent claims.

This Disclosure recognize a primary obstacle to using the optical Fourier transform in place of the FFT for general purpose computation is recovery of the phase of the generally complex result. Cameras recover only the intensity. The intensity I is related to the complex amplitude A by:

$$I = A^*A \quad (2)$$

where * represents complex conjugation.

This Disclosure solves the problem of recovering a signal from the intensity of its FT is important and has been extensively studied, where in general, iterative algorithms are used. In contrast to known iterative algorithms, this Disclosure provides a deterministic method which is enabled by having direct access to the input function. This Disclosure addresses the forward FT problem, not the backwards FT problem addressed by known phase retrieval algorithms.

In summary, this disclosure relates to optical devices and a method to recover the phase of the optical Fourier transform with intensity only measurements, ultimately permitting full complex-to-complex FTs to be performed optically. That is, there is disclosed herein a method to find the complex Fourier transform of a complex input function $z(x)$ using only intensity measurements. This method depends on having access to the input function, and being able to perform simple manipulations on it.

There is provided an optics-based method including the steps of:
1) Decomposing the input function into real and imaginary parts, yielding two real functions.
2) Decomposing each now real function into even and odd parts.
3) Performing an optical Fourier transform of each part individually. The phase is constrained.
4) Perturbing each of the parts and find the optical Fourier transform again. Comparison with (3) determines the phase.
5) Combining each of the component optical Fourier transforms to find the final complex optical Fourier transform.

By splitting a real function into even and odd components, the phase is constrained to binary values. Perturbing the function then allows discrimination between these values.

The inventors have devised a method that allows the full complex optical Fourier transform of an input function to be determined by calculations based on optical measurements of corresponding amplitude components. The inventors have recognised that this may be achieved by decomposing an input function into component functions having a Fourier transform in which the phase is constrained to a discrete number of possible values. In this respect, the phase may be described as being "quantised", "constrained to discrete values" or "discretised". The phase component is determined based on measurements of the amplitude component. It may therefore be understood that there is provided a hybrid optical-mathematical technique for determining the phase component of a complex Fourier transform.

The methods disclosed herein may be distinguished from so-called phase retrieval algorithms, such as those based on the Gerchberg-Saxton algorithm, in which an approximation of the phase information in the Fourier (frequency) domain is obtained from amplitude information in the spatial domain using an iterative process based on feedback. In contrast, methods in accordance with the present disclosure use both the real and imaginary part of the input function to directly calculate the phase function in the Fourier (frequency) domain based on optical measurements. Accordingly, full complex-to-complex forward Fourier transforms may be performed at high-speed with execution time independent of the size of the function.

Methods disclosed herein provide at least the following advantages:
Few physical measurements. Only 8 physical measurements are required to perform a full complex to complex optical Fourier transform, and they can be made in parallel. With eight SLMs of arbitrary resolution, the optical Fourier transform is performed within the refresh time of the system with no dependence on resolution. Higher precision than the hardware accuracy allows can be achieved by performing multiple optical Fourier transforms over different bit-planes of an arbitrary precision input function. In embodiments, eight measurements can be taken simultaneously, including the four sub-functions and the perturbed form of each sub-function. A multiple of eight measurements could be made to increase the precision of the calculation proportionally. The sub-function and the perturbed sub-function can therefore be measured at the same time and directly compared.

Computationally efficient. All of the electronic mathematical operations are performed independently at the pixel level. This makes rapid execution through massive parallelism (either on a general-purpose CPU, or on an application specific IC (ASIC) or FPGA) straightforward to implement in a high-speed system. Notably, no FFT, with the inherent O(nlogn) performance dependence on resolution, needs to be performed.

DC balancing. DC balancing is attractive for an optical Fourier transform-based system. The term DC refers to the mean of a signal (Direct Current from electrical engineering); and DC balancing refers to ensuring the DC magnitude of a signal is lowered (ideally to zero) in order avoid loss of resolution of the signal due to noise or limitations in the resolution of the system. If a signal is not DC balanced, the DC term in the optical Fourier transform can be much brighter than the rest of the transform, making it hard to record the optical Fourier transform on a system with a given dynamic range. The odd component $o(x)$ is inherently DC balanced. The even component can be shifted so that $ebal(x)=e(x)-<e(x)>$ is also DC balanced. This adjustment can be compensated for in the optical Fourier transform by changing the DC offset appropriately.

Advantageously, a method of performing a forward complex Fourier transform using information obtained in the optical domain is provided wherein the phase component of the forward complex Fourier transform is determined. Further advantageously, very few physical measurements are needed to perform a full complex to complex optical Fourier transform and they can be made in parallel. Further advantageously, the optical Fourier transform is performed within the refresh time of the optical system with no dependence on the resolution. Yet further advantageously, larger Fourier transforms can be performed without an increase in processing time by upscaling the optical system performing the optical Fourier transform.

BRIEF DESCRIPTION OF THE DRAWINGS

Embodiments of the present disclosure will now be described with reference to the accompanying drawings in which.

DETAILED DESCRIPTION

Figure 1:
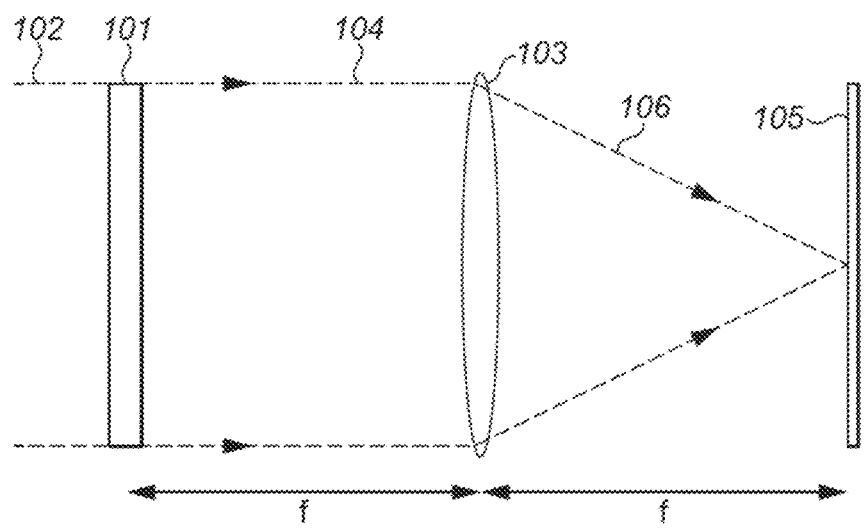
FIG. 1 shows the layout of a known optical Fourier transform (OFT) stage.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

Some disclosed embodiments are described in 1 dimension (1D). However, it may be readily understood that such embodiments naturally extend to 2D.

Phase-Determination

The present disclosure may be conveniently understood with reference to embodiments in which an input function and its Fourier transform are pixelated. That is, in embodiments, the complex Fourier transform of the input function is a pixelated representation of the complex Fourier transform of the input function comprising a spatial array of elements, wherein each element comprises an amplitude value and a phase value. In this respect, the complex optical Fourier transform of an input function may be considered as comprising two components: an amplitude function and a phase function. It may be understood that a discrete input corresponds to a discrete Fourier transform and the Nyquist-Shannon sampling theorem applies. In embodiments, the amplitude function of the complex Fourier transform of the input function is represented by the amplitude values of the elements. In embodiments, the phase function of the complex Fourier transform of the input function is represented by the phase values of the elements. However, it may be understood that the present disclosure is not limited to pixelated functions provided that the input is a continuously modulated light field.

Figure 2A:
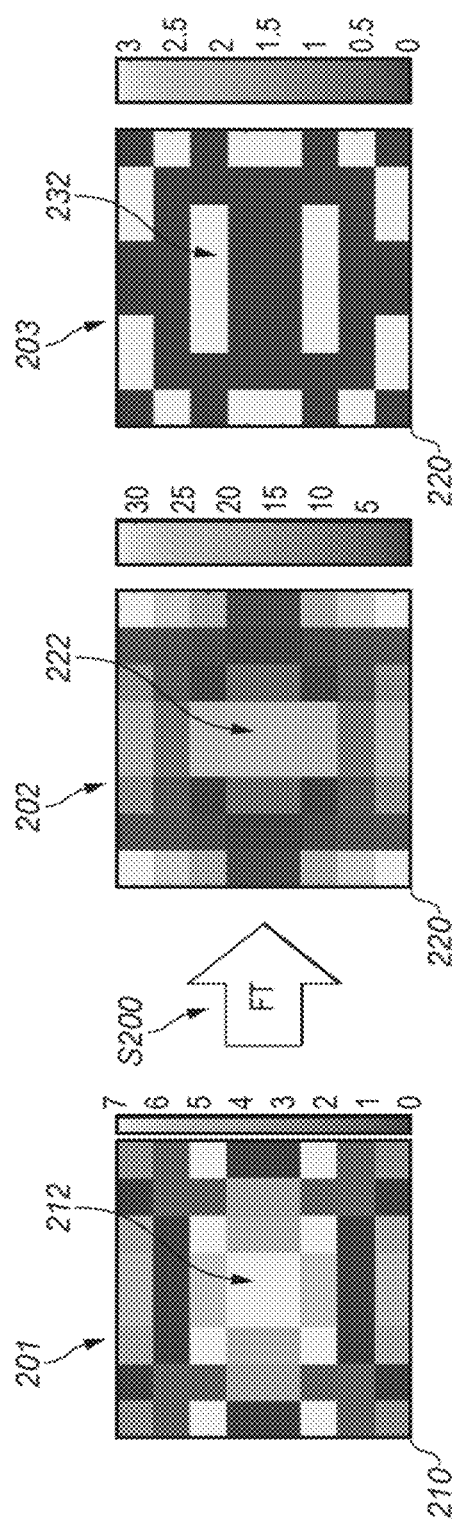
FIG. 2a shows a 2D sub-function and the amplitude and phase components of its optical Fourier transform.

FIG. 2a shows a pixelated image of an (amplitude only) input function 201 in the spatial domain 210 comprising a first 2D array of elements 212. The grey level shading of each element represents the amplitude value of that element. The optical Fourier transform of the input function 201 comprises an amplitude function 202 and a phase function 203. The optical Fourier transform may be performed by a lens. While the lens performs a true FT, the fact that a pixelated input is used means that it is a discrete Fourier transform (DFT) which is being performed. The amplitude function 202 is represented in the Fourier (or frequency) domain 220 by a second 2D array of elements 222. The phase function 203 is represented in the Fourier domain 220 by a third 2D array of elements 232.

In embodiments, the first amplitude function 202 is measured. In embodiments, the first amplitude function 202 is measured by a spatial light detector such as a CCD- or CMOS-based camera. The skilled person will understand that a number of different ways of measuring the amplitude function of an optical Fourier transform may be equally used. However, the phase function 203 cannot be easily measured. Therefore, a full Fourier transform cannot readily be performed by straightforward optical means only. However, the inventors have addressed this issue and provided a method in which the phase function of the optical Fourier transform is determined or derived based on optical intensity measurements of the corresponding amplitude function and, more specifically, changes in the amplitude function of the Fourier transform caused by changes to the input function.

In embodiments, the input function is changed by applying a so-called perturbation function to the input function to create a perturbed (input) function. It may be understood that a perturbation function is a function which provides a small change to the input function which leads to a corresponding small change to the Fourier transform of the input function. In embodiments, a perturbed (input) function is created by adding or subtracting (i.e. vector addition/subtraction of) a perturbation function $p(x, y)$ to/from the input function. The applied perturbation changes the amplitude function of the optical Fourier transform. In embodiments, the optical Fourier transform of the perturbation function $p(x, y)$ is in phase or out of phase with the optical Fourier transform of the unperturbed function.

Figure 2B:
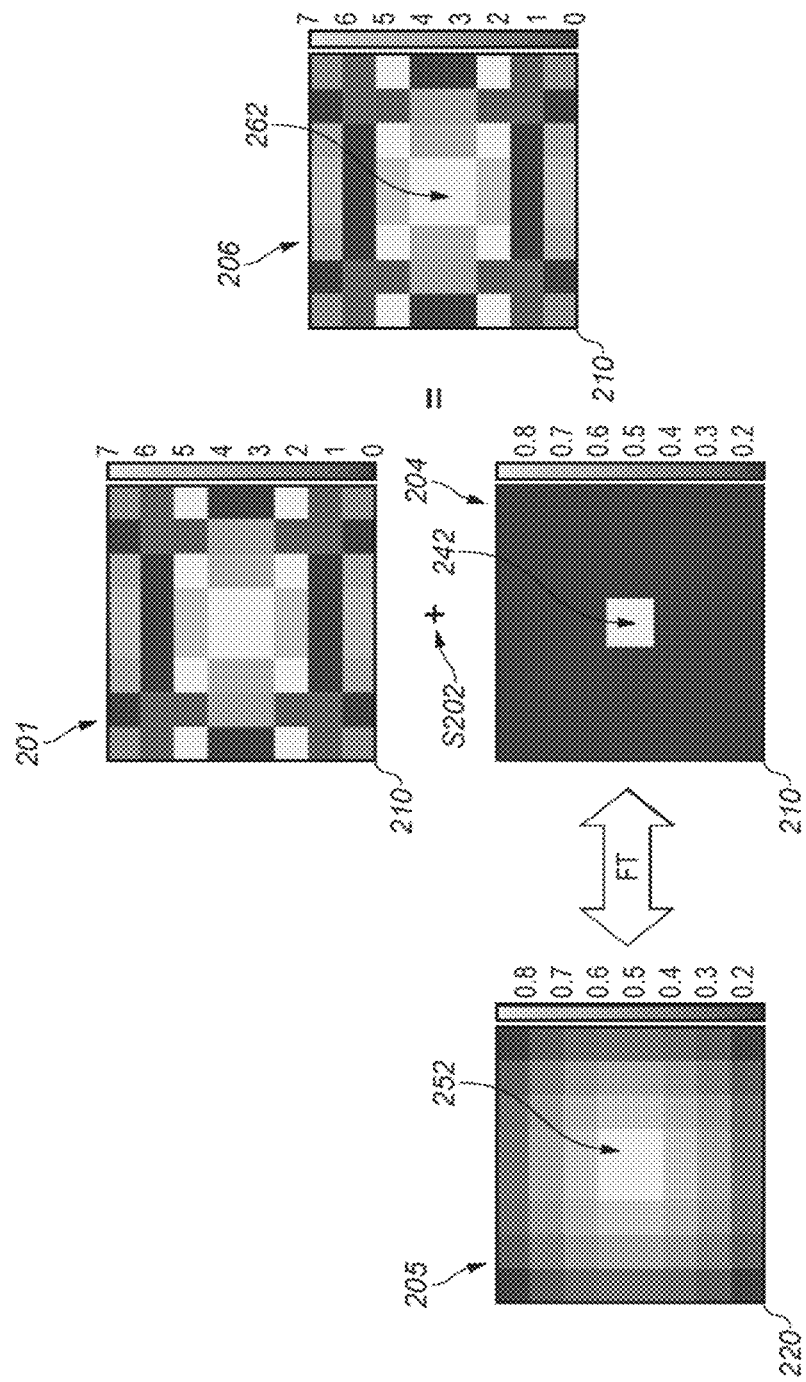
FIG. 2b shows a method of forming a 2D perturbed sub-function.

Embodiments are described with reference to FIG. 2b-2e. FIG. 2b shows the input function 201 represented in the spatial domain 210. FIG. 2b further shows a perturbation function 204 represented in the spatial domain 210 by a fourth array of elements 242. The perturbation function 204 may be described as a DC perturbation, a zero frequency perturbation or a discretized approximation to a Delta function on an SLM with finite pixel size. FIG. 2b further shows the optical Fourier transform 205 of the perturbation function. This is represented in the Fourier domain 220 by a fifth 2D array of elements 252. The addition of the perturbation function 204 to the input function 201 creates a perturbed function 206. Again, it may be understood that the perturbation function may be applied to the function in other ways to form the perturbed function 206. The perturbed function 206 is represented in the spatial domain 210 by a sixth 2D array of elements 262.

The perturbation function is a function which has an optical Fourier transform "OFT" with a known phase and amplitude profile. The OFT must be in phase or out-of-phase with the function being perturbed. It must not be $\pi/2$ out of phase with the function being perturbed, as then it is in quadrature and the amplitude of the Fourier transform will not vary with the phase of the unperturbed function.

It may be understood that any function with an FT which is non-zero across the Fourier plane and is not $\pi/2$ out of phase with the input is suitable.

Figure 2C:
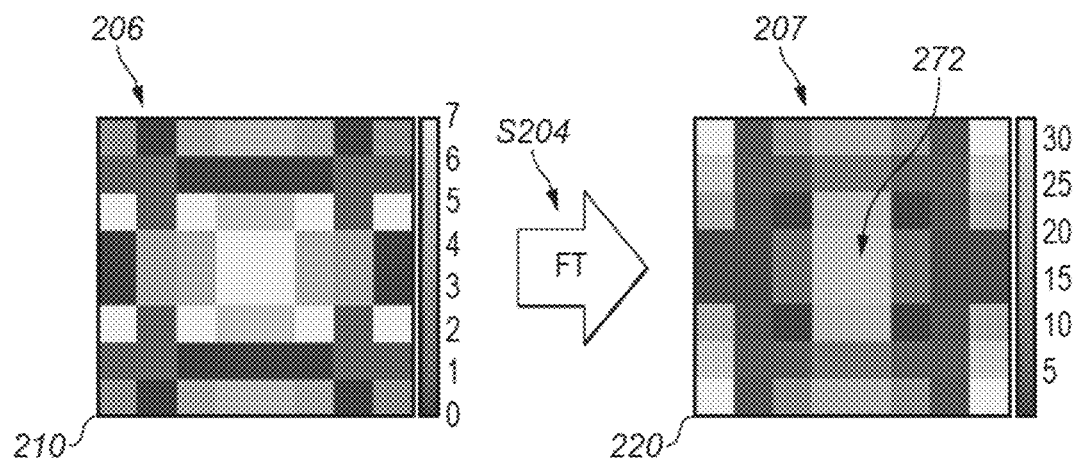
FIG. 2c shows a 2D perturbed sub-function and the amplitude component of its optical Fourier transform.
Figure 2D:
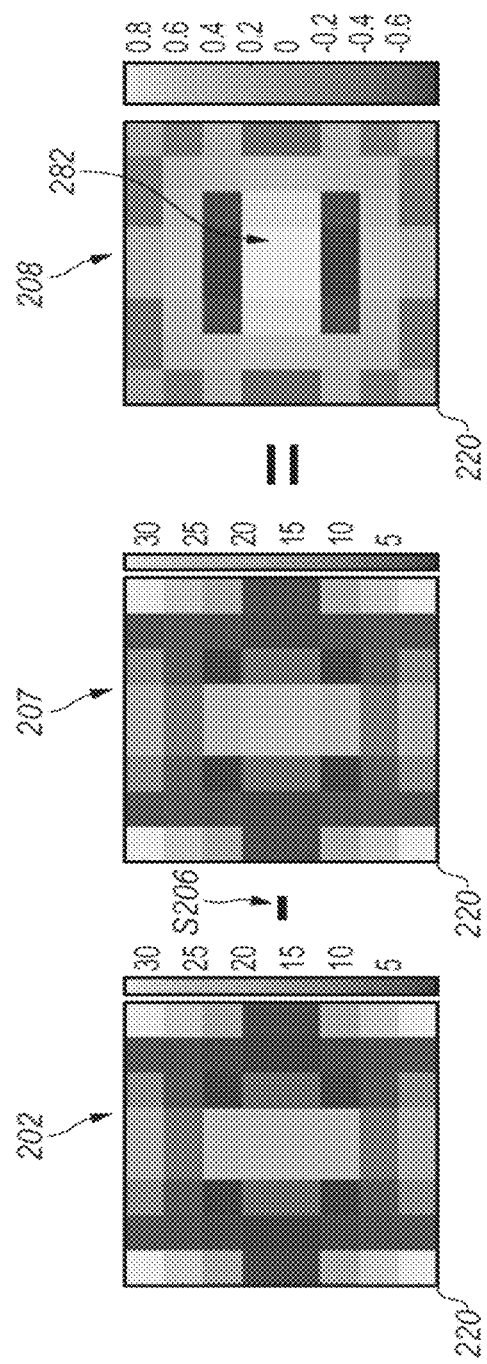
FIG. 2d shows a 2D difference function created by subtracting one optical Fourier transform amplitude component from another.

FIG. 2c shows the perturbed function 206 represented in the spatial domain 210. FIG. 2c further shows the amplitude function 207 of the Fourier transform of the perturbed function 206 comprising a seventh 2D array of elements 272. The corresponding phase function of the Fourier transform of the perturbed function is not shown. The amplitude function 207 (of the Fourier transform of the perturbed function 206) is compared with the amplitude function 202 (of the Fourier transform of the unperturbed input function 201) to measure a change caused by applying the perturbation. The inventors have recognized that this change in the amplitude function of the Fourier transform caused by applying the perturbation function in the spatial domain may be used to determine the phase function of the optical Fourier transform of the input function.

Advantageously, when using a 2D array of elements, all of the electronic mathematical operations may be performed at the element level. They lend themselves towards massive parallelism (application-specific integrated circuits, field-programmable gate arrays), making the task computationally efficient.

In embodiments, the amplitude value of each element in the Fourier transform of the unperturbed (input) function is compared with the amplitude value of the corresponding element in the Fourier transform of the perturbed (input) function in order to establish the phase value of the corresponding element in the Fourier domain. Notably, this is achievable because the input function is chosen such that the phase of its Fourier transform is constrained to a plurality of possible phase values which may be distinguished by applying an appropriate perturbation function as described.

In summary, there is therefore provided a method of determining a phase value of an element in a spatial array of elements arranged to form a pixelated representation of a complex Fourier transform of a function, wherein each element comprises an amplitude value and a phase value, wherein the phase value is constrained to a plurality of possible phase values, the method including: measuring a first amplitude value for the element by performing an optical Fourier transform of the function and detecting the light intensity at the element; and measuring a change in the amplitude value of the element caused by applying a perturbation function to the function.

The change in the amplitude value of the element caused by applying the perturbation function may be determined in a variety of ways. In an embodiment shown in FIG. 2d, the amplitude function 202 (of the Fourier transform of the unperturbed input function 201) is subtracted from the amplitude function 207 (of the Fourier transform of the perturbed function 206) to create a difference function 208 in the Fourier domain 220. The difference function 208 is represented by an eighth array of elements 282. The difference function 208 represents changes in the amplitude function in the Fourier domain caused by applying the perturbation function in the spatial domain.

There is therefore provided a method wherein the step of measuring a change in the amplitude value of the element includes: adding the perturbation function to the function to form a perturbed function; performing an optical Fourier transform of the perturbed function and detecting a second amplitude value of the element; and comparing the first amplitude value to the second amplitude value.

Optionally, there is provided a method wherein the change in the amplitude value caused by applying a perturbation function to the function is determined by subtracting the first amplitude value from the second amplitude value to form a difference value.

Figure 2E:
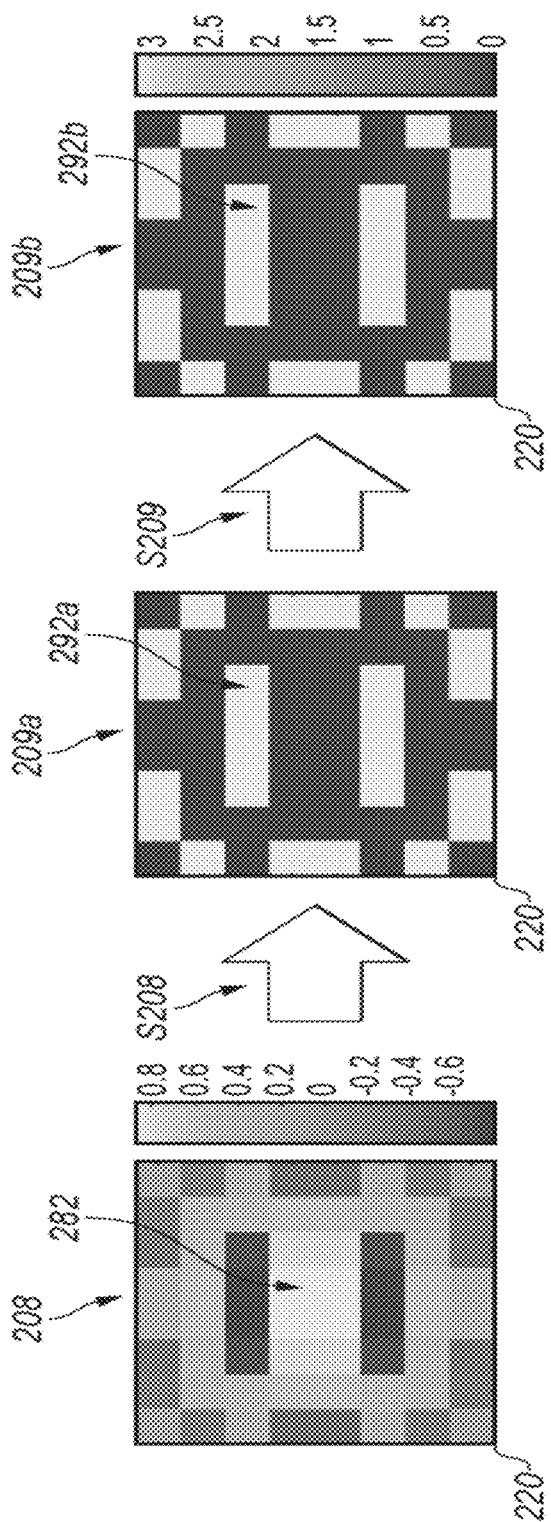
FIG. 2e shows a method of retrieving the phase function of an optical Fourier transform from a 2D difference function.

In embodiments, the difference function 208 is further processed. FIG. 2e shows the difference function 208. In step S208, the difference function is operated on by the sign function to create a sign function 209a in the Fourier domain 220. The sign function 209a is represented in the Fourier domain 220 by a ninth 2D array of elements 292a. In step S209, the sign function 209a is transformed into a determined phase function 209b. In embodiments, the determined phase function 209b is ascertained by assigning a first phase value to positive values of the sign function 209a and a second phase value to negative values of the sign function 209a. In other embodiments, the phase function is determined by assigning a first phase value to elements in the Fourier domain 220 which become brighter after the perturbation function is added to the input function and a second phase value to elements in the Fourier domain which become dimmer after the perturbation function is added to the input function. In both aforementioned embodiments, the first phase value and the second phase value are in phase and out of phase, respectively, with the Fourier transform of the perturbation function. Mathematically, the phase may be determined from the sign function by performing simple mathematical operations on it. For example, in an embodiment, the sign function is multiplied by $\pi/2$ to determine that points on the Fourier domain which have sign function values of +1 and −1 have phase values of $\pi/2$ and $-\pi/2$ relative to each other, respectively. In another embodiment, the sign function is multiplied by $\pi/2$ and increased by adding $\pi/2$ to determine that points in the Fourier domain which have sign function values of +1 and −1 on have phase values of $\pi$ and 0, respectively. The determined phase function 209b is represented in the Fourier domain 220 by a tenth 2D array of elements 292b. There is therefore provided a method wherein the sign of each element of the difference function is used to determine the corresponding phase value of the element.

The determined phase function 209b is the phase function of the Fourier transform of the input function. Accordingly, the phase values of the elements of the spatial array of elements arranged to form a pixelated representation of a Fourier transform of a function are determined. The method works because of the nature of the input function. Specifically, the phase of the optical Fourier transform of the input function is constrained to a plurality of possible phase values which may be distinguished by the method described herein.

Embodiments in which the phase is constrained to two values are described in the following by way of example only with reference to FIGS. 3 and 4. In other embodiments, the phase is constrained to three or more possible values. If the plurality of possible phase values numbers more than two, then it may be understood this method may, for example, be carried out a number of times in order to iteratively narrow down the number of possible phase values until only one possible phase value remains.

An individual element in the Fourier plane 220 may be considered as having an amplitude component and a phase component which can be represented together by a single point on an Argand diagram. The amplitude value on the Argand diagram is represented by the distance of the point from the origin and the phase is represented by the angular position of the point relative to the positive real axis. Points on the real axis of an Argand diagram may be considered as having a phase "constrained" to $n\pi$ radians, where n is an integer. The positive real axis has a constrained phase of $2n\pi$ radians. The negative real axis has a constrained phase of $(2n+1)\pi$. Points on the imaginary axis of an Argand diagram may be considered as having a phase constrained to $(n+1/2)\pi$ radians only. Points lying on the positive imaginary axis have a constrained phase of $(2n+1/2)\pi$ radians. Points lying on the negative imaginary axis have a constrained phase of $(2n+3/2)\pi$ radians.

Figure 3:
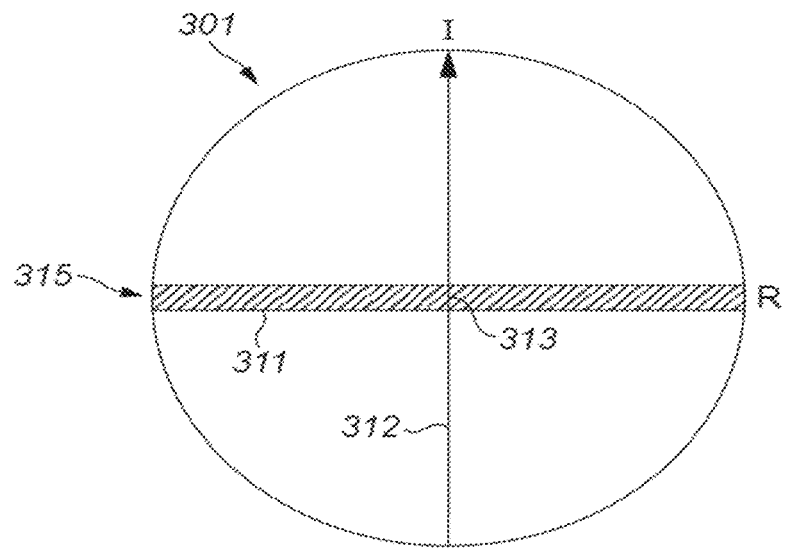
FIG. 3 shows a function on the real axis of an Argand diagram.

FIG. 3 shows an Argand diagram 301 comprising a real axis 311 and an imaginary axis 312 which bisect each other at right angles. The origin 313 lies at the point of intersection of the real axis 311 and the imaginary axis 312.

A first function 315 is shown by the bold line lying on the first real axis 311. Complex values of the first function do not have an imaginary component. Complex values of the first function have a phase of either zero radians or $\pi$ radians. Points lying on the real axis 311 have a phase of $\pi$ radians leftwards of the first origin point 313 and zero radians rightwards of the first origin point 313. The first function may be described as having a phase "constrained" to $n\pi$ radians, where n is an integer.

Figure 4:
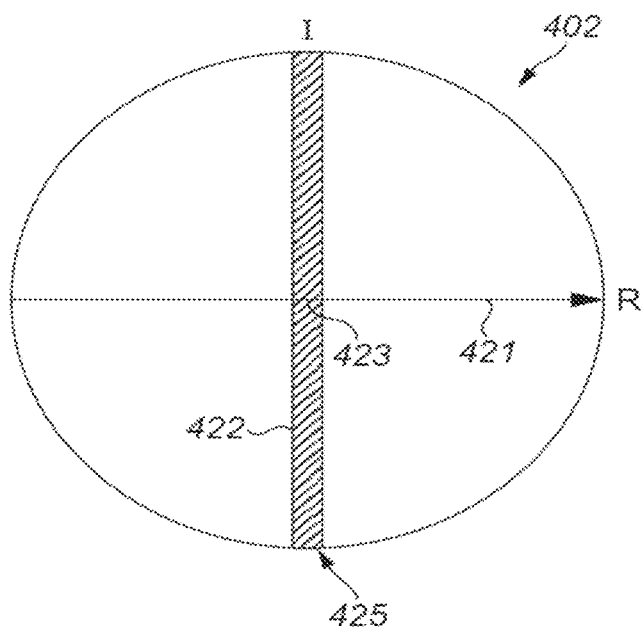
FIG. 4 shows a function on the imaginary axis of an Argand diagram.

Likewise, FIG. 4 shows an Argand diagram 402 and a second function 425 lying on the imaginary axis 422. Complex values of the second function do not have a real component. Complex values of the second function have a phase of either $\pi/2$ radians or $-\pi/2$ radians. Points lying on the second imaginary axis 422 have a phase of $\pi/2$ radians upwards of the origin 423 and $-\pi/2$ radians downwards of the origin 423. The second function may be described as having a phase "constrained" to $(n+1/2)\pi$ radians, where n is an integer.

The inventors have recognized that if the phase of the Fourier transform of the input function is "constrained", it is possible to determine the phase component by measuring the effect on the amplitude component caused by adding a perturbation function in the spatial domain. It may be said that the method is applicable to input functions having a Fourier transform which is "constrained" on the Argand diagram.

There is therefore provided a method as described herein, wherein each element (in the spatial array of elements arranged to form a pixelated representation of a complex Fourier transform of the function) comprises an amplitude value and a phase value in which the phase is constrained to two possible phase values.

In embodiments, one of the two possible phase values is $n\pi$ radians, where n is an integer. In embodiments, one of the two possible phase values is $(n+1/2)\pi$ radians, where n is an integer.

It may be understood that there are other manners in which the phase of the optical Fourier transforms of the input function may be constrained. In embodiments, the input function takes a form in which the optical Fourier transform has a constrained phase of $+1/3\pi$ radians or $+2/3\pi$ radians or any other conceivable combination.

However, in particularly advantageous embodiments, the two possible phase values are separated by an odd number of $\pi$ radians. In such cases, points which make up the Fourier transform of the function form a straight line on the Argand diagram. There is therefore provided a method wherein the phase is constrained to two values and the difference between the two values is $(2n+1)\pi$ radians, where n is an integer. This puts the two possible values on opposite sides of the Argand diagram. This is advantageous because it allows the two phase values to be conveniently distinguished by application of a perturbation.

The perturbation function is chosen to have a "broad" Fourier transform which therefore contributes to the amplitude value of all elements in the Fourier domain. In an embodiment, the perturbation function is chosen to contribute a small additive value to the amplitude value of all elements in the Fourier domain. In another embodiment, the perturbation function is chosen to contribute a small subtractive value to the amplitude value of all elements in the Fourier domain.

In an embodiment, the perturbation function is a so-called δ-function or delta function, or discrete approximation thereof. That is, the perturbation function has a small value around x=0 and is zero elsewhere. This corresponds to a single element in the centre of the spatial domain 210 having low amplitude surrounded by an array of elements with zero amplitude. Advantageously, in the Fourier domain, a delta function corresponds to a very broad feature. For example, a single pixel for the perturbation function p(x) would lead to the broadest sinc function of the optical Fourier transform P(u) of p(x) in the Fourier plane.

In advantageous embodiments, the function P(u) is in phase or $\pi$ out of phase with the optical Fourier transform of the input function f(x).

By the linearity of the Fourier transform (and by extension the optical Fourier transform), if F(u) is the unperturbed function and F'(u) the perturbed function:

$$F'(u)=F(u)+P(u) \qquad (3)$$

The perturbed function is given by:

$$F'(u)=(\sqrt{|F(u)|^2})e^{j(\varphi=(m,n))}+\varepsilon \qquad (4)$$

$$F'(u)=+(\sqrt{|F(u)|^2})+\varepsilon \text{ if } \varphi=m \qquad (5a)$$

$$F'(u)=-(\sqrt{|F(u)|^2})+\varepsilon \text{ if } \varphi=n \qquad (5b)$$

where $\varepsilon=\varepsilon(u)$ is a small positive real number, where m is the first of two possible phase values of F(u) and n is the second of two possible values of F(u) and where m is also the phase of P(u). In embodiments, it is necessary that m and n in equation 4 satisfy equations 5a and 5b, respectively. For example, in embodiments, where m has a value of 0 and n has a value of $\pi$, equations 5a and 5b hold true. A camera, for example, detects the intensities $|F(u)|^2$ and $|F'(u)|^2$.

The intensities of the F(u) and F'(u) are compared. If the intensity increases, then the perturbation is exactly in phase with the function; if the intensity decreases, then the perturbation is exactly anti-phase with the function.

$$|F'(u)|^2-|F(u)|^2 \{\varphi(u)=m \text{ if } >0$$

$$\{\varphi(u)=n \text{ if } <0 \qquad (6)$$

There is therefore provided a method as herein described, wherein the Fourier transform of the perturbation comprises an amplitude function and a phase function in which the phase is one of the plurality of possible phase values.

Advantageously, the effect of a sinc amplitude function P(u) with constant phase at the Fourier plane contributes a small additive or subtractive value to the amplitude value of all elements in the Fourier domain 220. Whether the contribution is subtractive or additive depends on whether the Fourier transform of the input function at any element is in phase or out of phase with the Fourier transform of the perturbation function at a single element in the Fourier domain 220.

Figure 5:
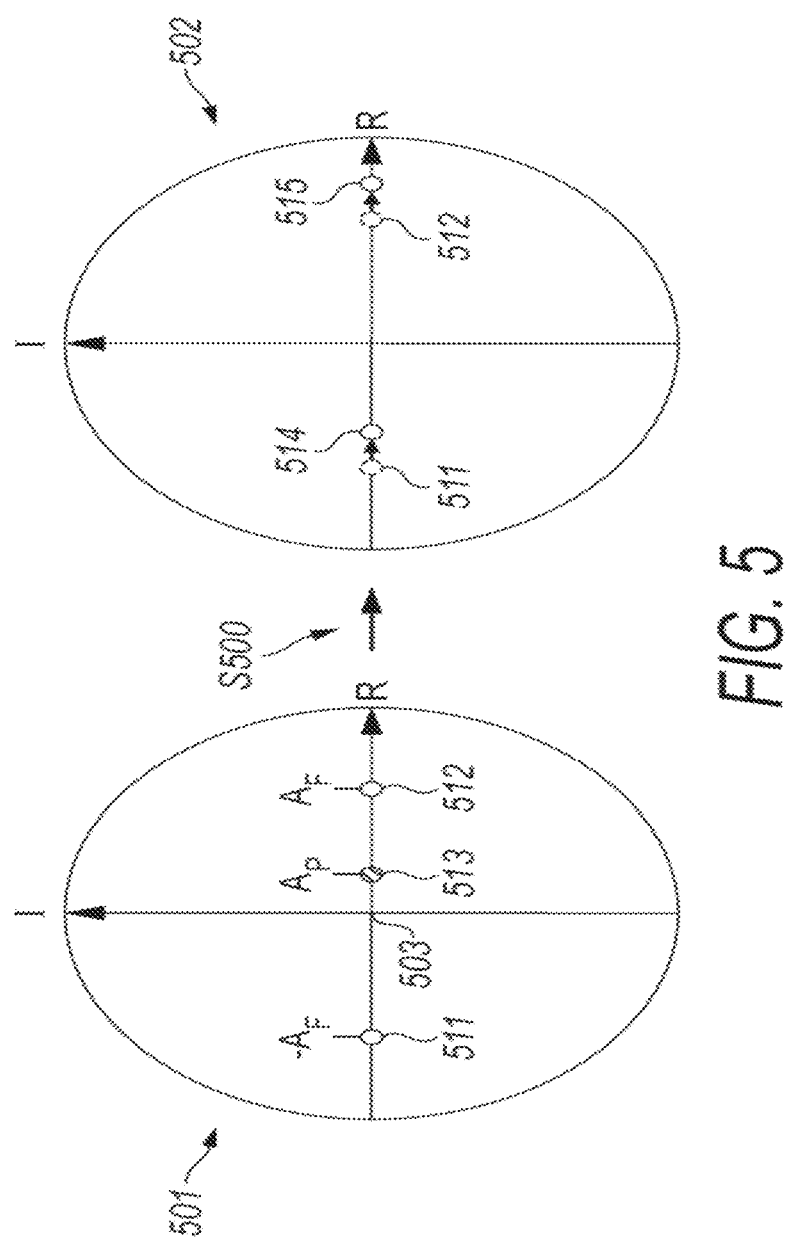
FIG. 5 shows the effect of adding a perturbation to points on the real axis of an Argand diagram.
Figure 6:
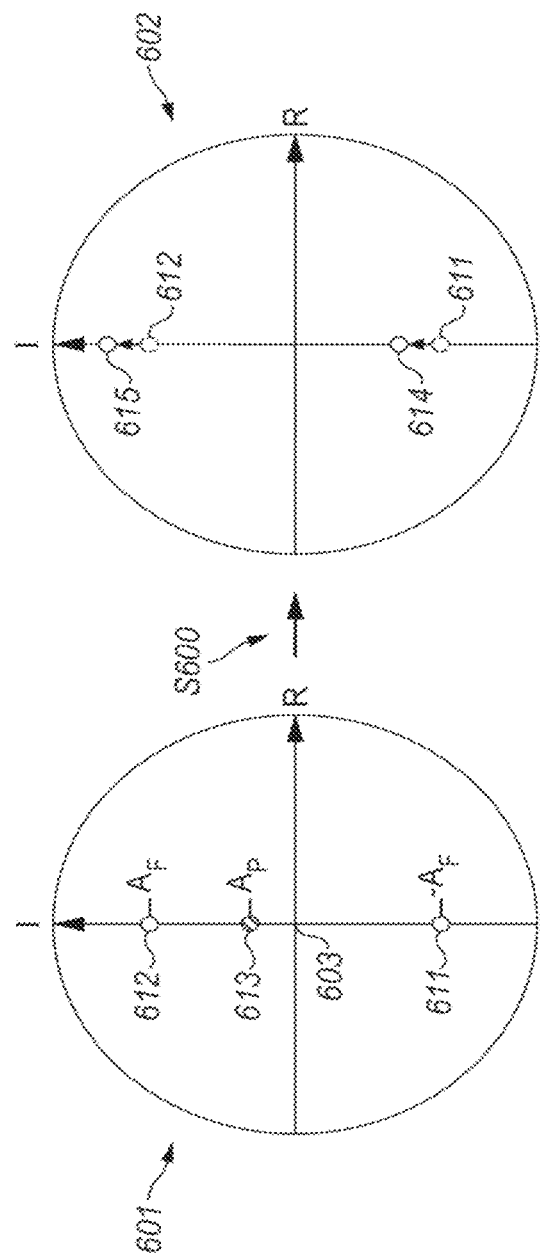
FIG. 6 shows the effect of adding a perturbation to points on the imaginary axis of an Argand diagram.

FIGS. 5 and 6 are illustrations which show how the phase value of an element may be determined from the plurality of possible phase values based on the contribution of the perturbation.

FIG. 5 shows a first point 511 lying on the negative real axis of a first Argand diagram 501. The first point 511 is displaced from the origin 503 of the first Argand diagram by $-A_F$. A second point 512 lying on the positive real axis of the first Argand diagram is displaced by $A_F$ from the origin 503. A third point 513 lying on the positive real axis is displaced from the origin by a distance $A_P$, where $A_P<A_F$. The first point 511 and second point 512 represent a pair of possible complex values of an element in the Fourier domain 220. The amplitude component magnitude $A_F$ of the element has been determined (by measurement) and the phase component has been constrained to one of two possible values by the nature of the input function: 0 radians and π radians. To determine the phase value from the two possible values, the complex value of the optical Fourier transform of a perturbation function at the element is added to the element. A third point represents a complex value at the element of the optical Fourier transform of a perturbation function. The perturbation function is of the form in which the phase (0 radians) of its optical Fourier transform at the element is known. A second Argand diagram 502 shows the result of adding the third point 513 to the first point 511 to create a first perturbed point 514. The second Argand diagram 502 also shows the result of adding the third point 513 to the second point 512 to create a second perturbed point 515. The magnitude of the amplitude of the first perturbed point 514 is therefore $|-A_F+A_P|$ and the amplitude of the second perturbed point 515 is $|A_F+A_P|$. The amplitude of the perturbed single point on the optical Fourier transform will therefore reduce if it is represented by the first point 511 and increase if it is represented by the second point 512. The phase of the single point on the optical Fourier transform is then determined to be 0 radians if the amplitude component magnitude increases and π radians if the amplitude component magnitude decreases.

Likewise, FIG. 6 shows a first point 611 lying on the negative imaginary axis of a first Argand diagram 601. The first point 611 is displaced from the origin 603 of the first Argand diagram by $-A_F$. A second point 612 lying on the positive imaginary axis of the first Argand diagram 601 is displaced by $A_F$ from the origin 603. A third point 613 lying on the positive imaginary axis is displaced from the origin 603 by a distance $A_P$, where $A_P<A_F$. The first point 611 and second point 612 represent a pair of possible complex values for an element in the Fourier domain 220. The amplitude component magnitude $A_F$ of the single point on the optical Fourier transform has been determined and the phase component has been constrained to one of two possible values: π/2 radians and −π/2 radians. To determine the phase value from the plurality of possible phase values, the complex value of the optical Fourier transform of a perturbation function at the element is added to the element in step S600. A third point represents a complex value at the element of the optical Fourier transform of a perturbation function. The perturbation function is of the form in which the phase (π/2 radians) of its optical Fourier transform at the element is known. A second Argand diagram 602 shows the result of adding the third point 613 to the first point 611 to create a first perturbed point 614. The second Argand diagram 601 also shows the result of adding the third point 613 to the second point 612 to create a second perturbed point 615. The magnitude of the amplitude of the first perturbed point 614 is therefore $|-A_F+A_P|$ and the amplitude of the second perturbed point 615 is $|A_F+A_P|$. The amplitude component magnitude of the single point on the optical Fourier transform will therefore reduce if it is represented by the first point 611 and increase if it is represented by the second point 612. The phase of the single point on the optical Fourier transform is then determined to be π/2 radians if the amplitude component magnitude increases and −π/2 radians if the amplitude component magnitude decreases.

The functions shown in FIGS. 3 and 4 are given by way of example only and represent the possible complex values for elements in the Fourier domain for two special cases. Specifically, the first function 315 represents the possible complex values of elements in the Fourier domain wherein the input function is a real even function. The second function 415 represents the possible complex values of elements in the Fourier domain wherein the input function is a real odd function.

Table 1 below shows the form of Fourier transforms of four forms of functions.

| f (x) | F (u) |
|---|---|
| real, even | real, even |
| real, odd | imag, odd |
| imag, even | imag, even |
| imag, odd | real, odd |

Table 1 shows that the Fourier transform of a real even function is purely real, therefore having a phase constrained to 0 or π, and the Fourier transform of a real odd function is purely imaginary, therefore having a phase constrained to π/2 or −π/2.

It may be understood that the perturbation function may be chosen based on the nature of the input function. In embodiments, the perturbation function is selected such that its optical Fourier transform has a phase value which is constrained to one of the plurality of possible phase values of the optical Fourier transform of the input function. For example, if the input function is real and odd, then a suitable perturbation function would be a real and odd or imaginary and even. This would cause the Fourier transforms of both the input function and the perturbation function to have a phase that was constrained to π/2 or −π/2.

The even and odd functions e(x) and o(x) may be optically Fourier transformed to form the Fourier transform functions E(u) and O(u) shown in equations 7 and 8:

$$e(x) \overset{OFT}{\Longrightarrow} E(u) = \sqrt{(|E(u)|^2)}e^{j\varphi(u)} \quad (7)$$

$$o(x) \overset{OFT}{\Longrightarrow} O(u) = \sqrt{(|O(u)|^2)}e^{j\varphi(u)} \quad (8)$$

Embodiments take advantage of the symmetry properties of the FT shown in Table 1. The FT of an even function is purely real, and the Fourier transform of an odd function is purely imaginary. Thus, we have constrained the phase for E(u) and O(u) to one of two discrete values as shown below in equations 9 and 10.

$$E(u)=\sqrt{(|E(u)|^2)}e^{j\varphi(u)}, \varphi(u)\in\{0,\pi\} \quad (9)$$

$$O(u)=\sqrt{(|O(u)|^2)}e^{j\varphi(u)}, \varphi(u)\in\{\pi/2,-\pi/2\} \quad (10)$$

There is therefore provided a method as herein described wherein the input function is an even function or an odd function.

It may be understood that any generally narrow DC (or zero frequency) function is suitable for use as the perturbation function as it will lead to a wide function in the Fourier domain. In embodiments, the perturbation function is found by an optimisation method (i.e. designed by a computer algorithm) to satisfy the requirements that the FT of the perturbation function is non-zero across the Fourier plane and is not pi/2 out of phase with the input. In embodiments, the perturbation function adjusts the amplitude (grayscale) value of a single pixel in order to alter the values of all pixel values in the Fourier domain. For example, the DC (or zero frequency) pixel in the input function may be adjusted by a grayscale value of one unit.

The finite width of the SLM pixels leads to an overall sinc envelope over the replay field (the Fourier domain). A perfect delta function will lead to the broadest sinc function over the Fourier domain. However, replicating the perfect delta function is not possible using an SLM with a finite pixel width. It is desirable that the effect of the perturbation function is to add a small additive value of equal magnitude to all pixels in the Fourier domain. A delta function on an SLM leads to unequal additive values being applied across the Fourier domain. In embodiments, this is compensated for by multiplying the pixel values by 1/sinc. It may be understood that a sinc function in the Fourier domain is also created by the input function itself. Each rectangular pixel of the SLM samples the input function and creates its own sinc function in the Fourier domain. In embodiments, the effect of these sinc functions may also be compensated for in a similar fashion to that of the sinc function created by the perturbation function.

The methods described herein may be performed using the optical components of FIG. 1. In embodiments, the input function and perturbed input function are represented or "displayed" on a spatial light modulator and the Fourier transform is performed optically by an appropriately positioned Fourier transform lens. In embodiments, the amplitude component of the Fourier transform of the input function and perturbed input function is detected by a spatial light detector such as a CCD-based device.

In embodiments, there is therefore provided a method wherein the step of measuring the first amplitude value includes: displaying the input function on a spatial light modulator; illuminating the spatial light modulator to form spatially modulated light; Fourier transforming the spatially modulated light using a Fourier transform lens; and detecting the intensity at the element.

Square rooting the detected intensity at the pixel allows a measurement of the amplitude to be obtained. In embodiments, there is therefore provided a further step of square-rooting the detected intensity, optionally wherein the step of detecting the intensity at the element comprises detecting the intensity using a photodetector.

It may be understood that the methods as herein described may be part carried out using optical means and part carried out using computing means. Performing the Fourier transform of an input function may be completed in a series of discrete steps, wherein some steps are carried out using optical means and some steps are carried out using computing means.

There is therefore provided a device for determining a phase value of an element in a spatial array of elements arranged to form a pixelated representation of a complex Fourier transform of a function, wherein each element comprises an amplitude value and a phase value in which the phase is constrained to a plurality of possible phase values, the device including: an optical system arranged to measure the amplitude value at the element and changes in the amplitude value at the element caused by applying a perturbation function to the function; and a processor arranged to: determine the phase value at the element from the measured amplitude value at the element and the measured changes in the amplitude value at the element caused by applying a perturbation function to the function.

In embodiments, the optical system includes: a spatial light modulator arranged to display the input function; a light source arranged to illuminate the spatial light modulator to form spatially modulated light; a Fourier transform lens arranged to receive the spatially modulated light and Fourier transform the spatially modulated light; a photodetector arranged to detect the intensity distribution at the element at the Fourier plane of the Fourier transform lens.

In embodiments, the spatial light modulator and the Fourier transform lens are separated by a distance equal to the focal length of the Fourier transform lens and the Fourier transform lens and the photodetector are separated by a distance equal to the focal length of the Fourier transform lens. However, the skilled person will understand how to determine the position of the components if the light is not collimated.

In embodiments, no lens is used, and the camera is placed very far away from the SLM in the optical far field. As used herein an "optical far field" refers to a distance where the Fraunhofer approximation is valid. That is, the distance z from the aperture of the camera to the SLM satisfies $z \gg k (x^2)/2$, where k is the optical wavenumber ($2\pi/\lambda$) and where x is the size of the aperture. In some embodiments, the SLM has a very small pixel size such that the Fraunhofer approximation is satisfied. In some embodiments, the combination of the distance between the camera and the SLM and the pixel size of the SLM is chosen such that the Fraunhofer approximation is satisfied.

Complex Fourier Transform

The inventors have also realized that any input function may be decomposed into a plurality of sub-functions in which the phase function of the Fourier transform of each sub-function may be separately determined by the above method and combined together to form the phase component of the Fourier transform of the input function. There is therefore provided a new hybrid computation-optical technique for determining full complex Fourier transforms. In summary, the method includes: decomposing an input function into a plurality of sub-functions; performing the phase-determination method set out above for each sub-function to find a phase function for each sub-function; and combining phase and amplitude functions of the sub-functions to form the complex Fourier transform of the input function.

Figure 7:
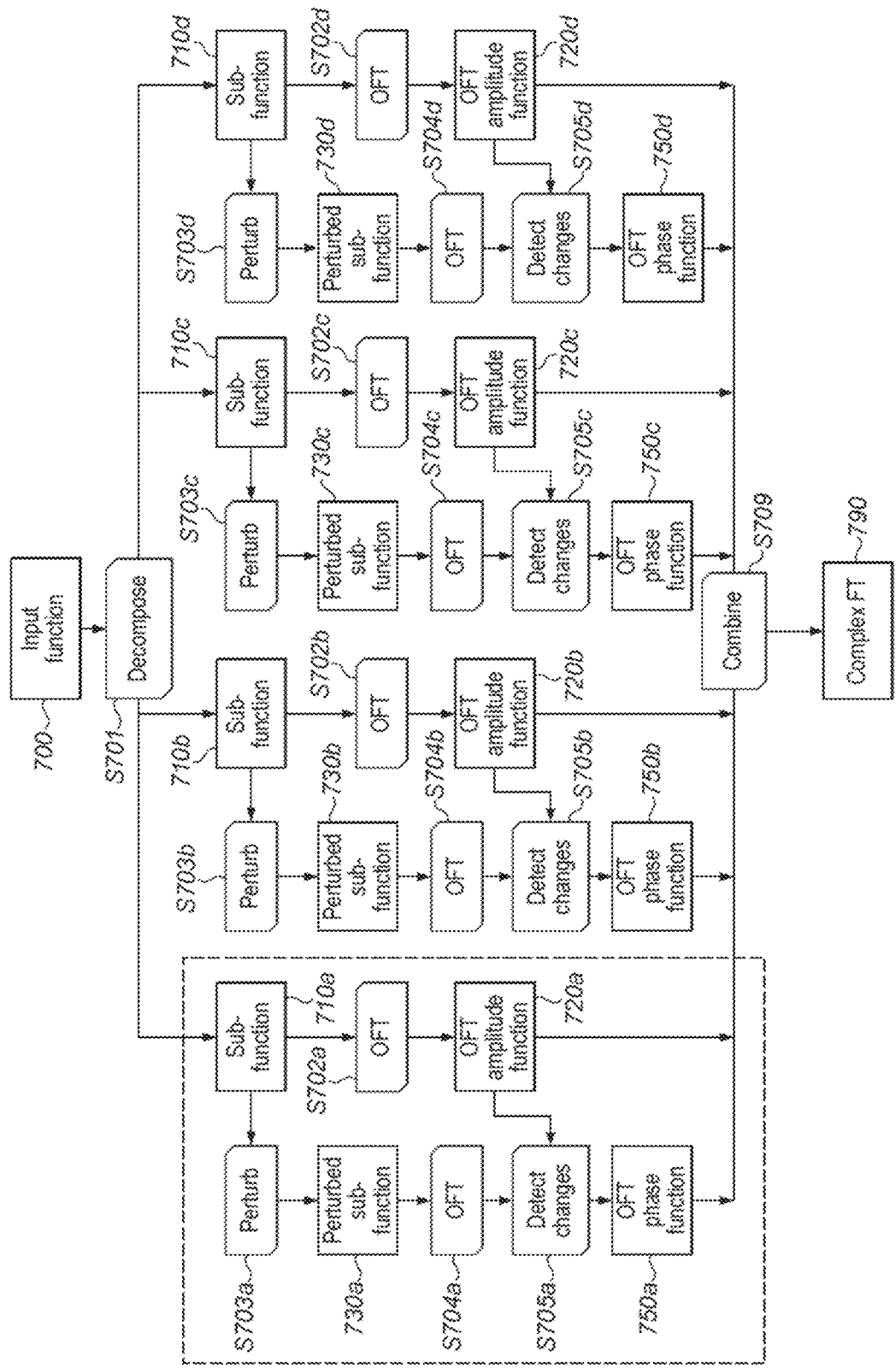
FIG. 7 shows a flow chart illustrating a method for performing an optical full complex to complex Fourier transform of an input function.

An overview of the method of determining the complex Fourier transform of a complex input function z(x) in accordance with an embodiment is illustrated in the flow chart of FIG. 7. An input function 700 is decomposed in step S701 into a plurality of particular sub-functions 710a, 710b, 710c, and 710d. The Fourier transform of each sub-function has a phase function in which the phase is constrained to a plurality of possible values. In embodiments, the phase is constrained to two possible values. Each sub-function is subjected to a series of steps which are described below with reference to sub-function 710a.

An optical Fourier transform of the sub-function 710a is carried out in step S702a in order to generate an amplitude function 720a which is detectable by a suitable optical detector. For example, the amplitude function 720a may be measured using a photodetector array. A perturbation is applied to the sub-function 710a in step S703a in order to generate a perturbed sub-function 730a. An optical Fourier transform of the perturbed sub-function 730a is carried out in step S704a. The amplitude function of the Fourier transform of the perturbed sub-function 730a is also measured by, for example, a photodetector array. Changes in the measured amplitude function 720a caused by applying the perturbation are determined in step S705a from which the phase function 750a of the complex Fourier transform of the sub-function is determined. The measured amplitude functions 720a-720d and the determined phase functions 750a-750d are combined in step S709 in order to form the full complex Fourier transform 790 of the input function 700, as will be described in greater detail below.

Although FIG. 7 shows four sub-functions 710a-710d, it may be understood that a plurality of sub-functions numbering more than or less than four may also be used. The method may be used to perform an optical Fourier transform of either a 1D, or a 2D function. It may be said that the method depends on having access to the input function, and being able to perform simple manipulations on it.

Embodiments and figures relate to pixelated functions and Fourier transforms by way of example only. It may be understood that the methods disclosed herein are applicable to any input function comprising amplitude and phase information.

It may be understood that there is provided a method of performing a complex Fourier transform of an input function comprising amplitude and phase information, the method including the steps of: decomposing the input function into a plurality of sub-functions, wherein the Fourier transform of each sub-function comprises an amplitude function and a phase function in which the phase is constrained to a plurality of possible phase values; determining the phase function of the Fourier transform of each sub-function by measuring the amplitude function of an optical Fourier transform of the sub-function and changes in the amplitude function of the optical Fourier transform caused by applying a perturbation function to the sub-function; combining the determined phase functions and the measured amplitude functions for each sub-function to form the complex Fourier transform of the input function.

Advantageously, a method of performing a Fourier transform is provided wherein computing resources are effectively outsourced to the optical domain. This allows larger Fourier transforms to be carried out faster than using digital electronic computing means alone. Further advantageously, a method is provided in which a full complex Fourier transform of an input function can be carried out using optically-detected amplitudes only. This enables full complex Fourier transforms to be carried out substantially in the optical domain. The rate at which Fourier transforms may be performed in the optical domain can be of the order of the refresh rate of the optical means, which is faster than can be completed using computer algorithms using cost equivalent computer processing means.

In embodiments, the input function is decomposed in a two-stage process. The input function $z(x)$ can be represented in complex form, having a real part $R\{z(x)\}$ and an imaginary part $jI\{z(x)\}$:

$$z(x)=R\{z(x)\}+jI\{z(x)\} \quad (11)$$

$$z(x)=a(x)+jb(x) \quad (12)$$

$a(x)$ and $b(x)$ represent the real part and the real component of the imaginary part, respectively;
$a(x)$ and $b(x)$ are, therefore, purely real functions.

$a(x)$ and $b(x)$ may be subsequently decomposed themselves into sub-functions.

As explained earlier, the method of determining the phase for each sub-function is simplified in cases in which the phase of the optical Fourier transform of the sub-function is constrained to two possible phase values.

There is therefore provided a method as described herein, wherein the step of decomposing the input function into a plurality of sub-functions comprises decomposing the input function into a plurality of sub-functions, wherein the Fourier transform of each sub-function comprises an amplitude function and a phase function in which the phase is constrained to two possible phase values.

It may be understood that there are several ways in which the phase of the optical Fourier transforms of the input function may be constrained to two possible values.

In embodiments, there is provided a method wherein the difference between the two possible phase values for at least one of the sub-functions is $(2n+1)\pi$ radians, where n is an integer. In embodiments, one of the two possible phase values for at least one of the sub-functions is $n\pi$ radians, where n is an integer. In embodiments, one of the two possible phase values for at least one of the sub-functions is $(n+1/2)\pi$ radians, where n is an integer.

In embodiments, the number of possible phase values of the optical Fourier transform of a sub-function is constrained to a plurality of possible phase values by selecting the sub-function to be either an even function or an odd function.

The real function $f(x)$, representing either $a(x)$ or $b(x)$ from equation 12, may be decomposed into its even and odd components, given by equations 13 and 14, respectively.

$$e(x)=1/2(f(x)+f(-x)) \quad (13)$$

$$o(x)=1/2(f(x)-f(-x)) \quad (14)$$

Such that:

$$f(x)=e(x)+o(x) \quad (15)$$

The even and odd components have the property that:

$$e(x)=e(-x) \quad (16)$$

$$o(x)=-o(-x) \quad (17)$$

Figure 8:
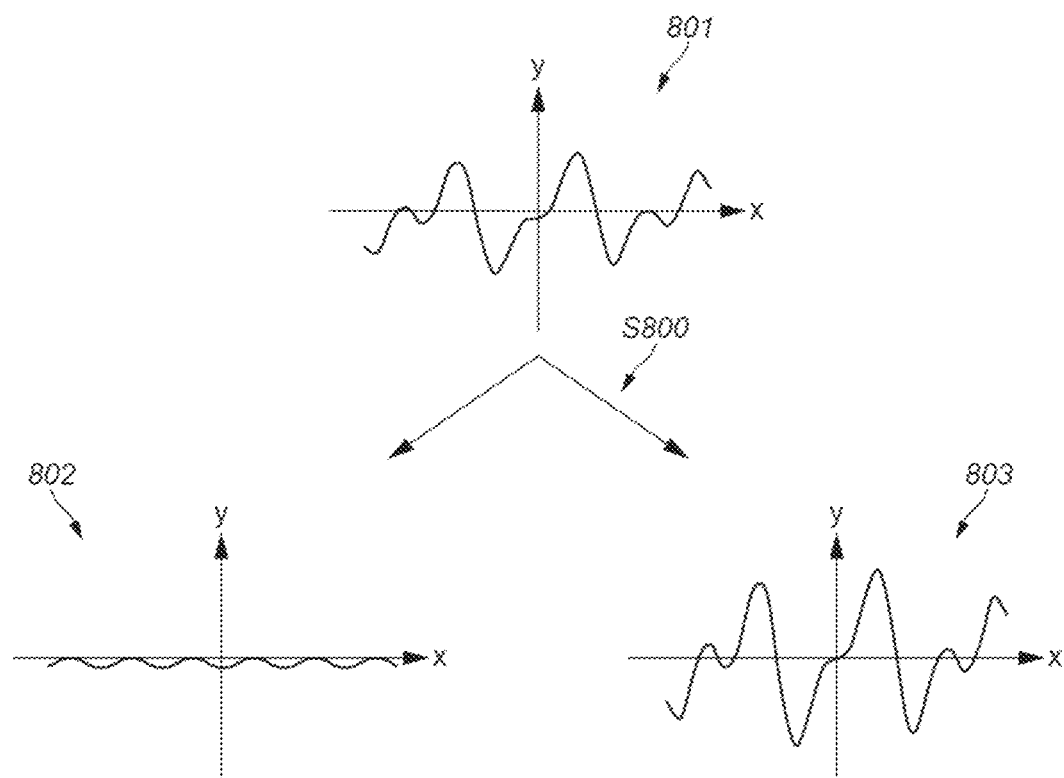
FIG. 8 shows a function and its odd and even components.

This is illustrated graphically for the case of a 1D function in FIG. 8. A real function 801 represented on an x-y plane may be decomposed in step S800 into a real even function 802 represented on an x-y plane and a real odd function 803 represented on an x-y plane.

Figure 9:
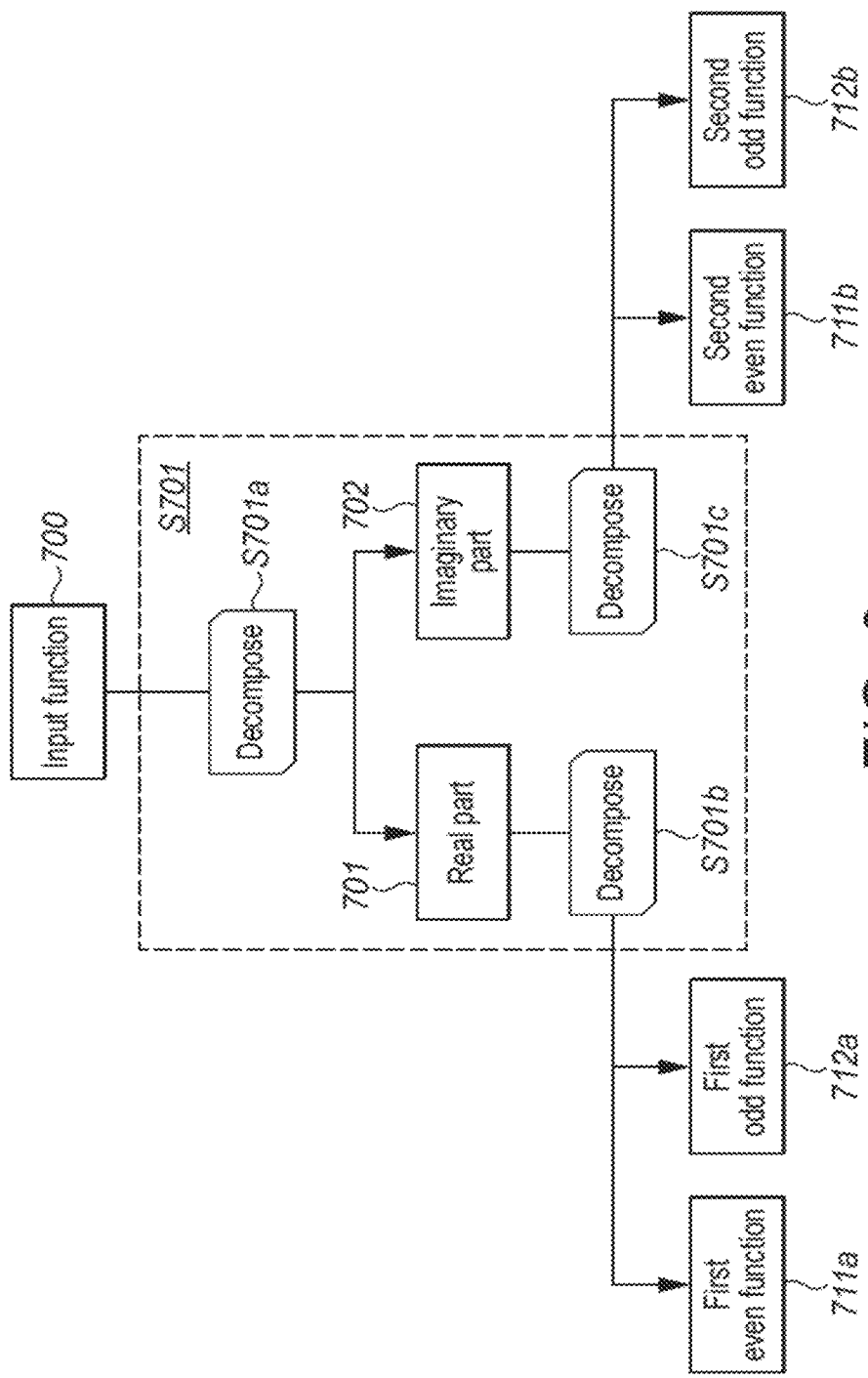
FIG. 9 shows a flowchart illustrating a method for decomposing an input function into even and odd functions.

An embodiment representing how the input function may be decomposed into a plurality of sub-functions comprising only odd functions and even functions is shown in the flow chart of FIG. 9. In FIG. 9, the input function 700 is decomposed into a real part 701 and an imaginary part 702. The real part 701 is decomposed in step 701b into a first even function 711a and a first odd function 712a. The real component of the imaginary part 702 is decomposed in step 701c into a second even function 711b and a second odd function 712b. The first even function 711a, first odd function 712a, second even function 711b and second odd function 712b are examples of the sub-functions 710a, 710b, 710c and 710d, respectively, of FIG. 7.

There is therefore provided a method as herein described wherein the plurality of sub-functions comprises a first plurality of sub-functions and a second plurality of sub-functions and the step of decomposing the input function into the plurality of sub-functions comprises: determining the real component and the imaginary component of the input function; decomposing the real component of the input function into a first plurality of sub-functions; decomposing the imaginary component of the input function into a second plurality of sub-functions. There is further provided a method wherein the first plurality of sub-functions is a first even function and a first odd function and wherein the second plurality of sub-functions is a second even function and a second odd function.

Advantageously, in accordance with the present disclosure, when the input function is decomposed into a first even function and a first odd function and a second even function and a second odd function, only eight optical measurements are required to perform a full complex to complex optical Fourier transform. It may also be appreciated that these measurements could be made in parallel. With eight SLMs of arbitrary resolution, higher precision than the hardware accuracy allows can be achieved by performing multiple optical Fourier transforms over different bit-planes of an arbitrary precision input function.

In embodiments, each sub function is subjected to the phase-determination method described previously.

It may therefore be understood that in embodiments, there is provided a method including the step of measuring changes in the amplitude function caused by applying a perturbation function which comprises: adding the perturbation function to the sub-function to form a perturbed sub-function; performing an optical Fourier transform of the perturbed sub-function and detecting the amplitude function of the Fourier transform of the perturbed sub-function; and comparing the measured amplitude function of the Fourier transform of the sub-function to the amplitude function of the Fourier transform of the perturbed sub-function. In embodiments, the amplitude is obtained by square rooting intensity.

It may be understood that the each sub-function and its Fourier transform can be represented in a pixelated array. Each sub-function is therefore represented as a 2D array of elements as shown for the input function 201 in FIG. 2a. The method of FIGS. 2b to 2e is then carried out for each sub-function in order to measure an amplitude function and determine a phase function. The measured amplitude function is the amplitude component of the optical Fourier transform of the sub-function and the determined phase function is the phase component of the optical Fourier transform of the sub-function. The complex Fourier transform of the sub-function is formed by combining the measured amplitude function and the determined phase function.

In embodiments, the methods described herein further comprise the step of forming the complex Fourier transform of each sub-function using the determined phase function and measured amplitude function for each sub-function.

There is therefore provided a method as described herein, wherein the complex Fourier transform of the sub-function is a pixelated representation of the complex Fourier transform of the sub-function comprising a spatial array of elements, wherein each element comprises an amplitude value and a phase value. Further, wherein the amplitude function of the complex Fourier transform of the sub-function is represented by the amplitude values of the elements and wherein the phase function of the complex Fourier transform of the sub-function is represented by the phase values of the elements.

It may be appreciated from the following that the perturbation is chosen based on the nature of the sub-functions. In embodiments in which the plurality of sub-functions comprises even functions and odd functions, the perturbation functions are given by:

$$E'(u)=E(u)+P(u) \tag{18}$$

$$E'(u)=(\sqrt{|E(u)|^2})e^{j(\varphi=\{0,\pi\})}+\varepsilon \tag{19}$$

$$E'(u)=+(\sqrt{|E(u)|^2})+\varepsilon \text{ if } \varphi=0$$

$$E'(u)=-(\sqrt{|E(u)|^2})+\varepsilon \text{ if } \varphi=\pi \tag{20}$$

$$O'(u)=O(u)+P(u) \tag{21}$$

$$O'(u)=(\sqrt{|O(u)|^2})e^{j(\varphi=\{\pi/2,-\pi/2\})}+\varepsilon e^{j\pi/2} \tag{22}$$

$$O'(u)=j(+(\sqrt{|O(u)|^2})+\varepsilon) \text{ if } \varphi=\pi/2$$

$$O'(u)=j(-(\sqrt{|O(u)|^2})+\varepsilon) \text{ if } \varphi=-\pi/2 \tag{23}$$

where $\varepsilon=\varepsilon$ (u) is a small positive real number. As before, the camera detects the intensities $|E'(u)|^2$ and $|O'(u)|^2$.

The intensities of the unperturbed and perturbed functions are compared. If the intensity increases, then the perturbation is in phase with the function; if the intensity decreases, then the perturbation is anti-phase with the function, $$|E(u)'|^2-|E(u)|^2 \{\varphi(u)=0 \text{ if } >0$$

$$\{\varphi(u)=\pi \text{ if } <0 \tag{24}$$

$$|O(u)'|^2-|O(u)|^2 \{\varphi(u)=\pi/2 \text{ if } >0$$

$$\{\varphi(u)=-\pi/2 \text{ if } <0 \tag{25}$$

It may therefore be understood that in embodiments, there is provided a method wherein the changes in the amplitude function of the optical Fourier transform caused by applying a perturbation function to the sub-function are determined by subtracting the measured amplitude function of the Fourier transform of the sub-function from the amplitude function of the Fourier transform of the perturbed sub-function to form a difference function. In embodiments, the sign of the difference function is used to determine the phase function of the Fourier transform of each sub-function.

Having performed the methods described for each sub-function, the information needed to obtain the complex Fourier transform of the real function f(x) is available. This is given by:

$$F(u) = F\{f(x)\} \tag{26}$$

$$= F\{e(x) + o(x)\} \tag{27}$$

$$= F\{e(x)\} + F\{o(x)\} \tag{28}$$

$$= E(u) + O(u) \tag{29}$$

$$= (\sqrt{|E(u)|^2})e^{j\varphi} + (\sqrt{|O(u)|^2})e^{j\varphi} \tag{30}$$

where $|E(u)|^2$ and $|O(u)|^2$ are the intensities which may be directly measured by a camera (the first two measurements), and the phases φ(u) are uniquely constrained by the change in intensity after application of the perturbation (the second two measurements).

This procedure is applied twice to the functions real functions a(x) and b(x) from equation 12, to obtain the complex functions A(u) and B(u), which represent the complex Fourier transform of the real part 770a and the complex Fourier transform of the imaginary part 770b, respectively.

The Fourier transform of the real part 701 and the real component of the imaginary part 702 are represented by A(u) and B(u), respectively, in equations 31 and 32.

$$a(x) \stackrel{OFT}{\Longrightarrow} A(u) \in Z \quad (31)$$

$$b(x) \stackrel{OFT}{\Longrightarrow} B(u) \in Z \quad (32)$$

Provided that the complex Fourier transform of real part 701 and the real factor of the imaginary part 702 (A(u) and B(u)) of the input function 700 can be found it is possible to recombine them to form the complex Fourier transform 790 of the input function 700. The full complex Fourier transform of the complex function z(x), which represents the input function 700, is then obtained by equation 33.

$$F\{z(x)\}=Z(u)=A(u)+jB(u) \quad (33)$$

In embodiments the methods described herein further comprise the step of combining the respective complex Fourier transforms of the sub-functions to form the complex Fourier transform of the input function.

Figure 10:
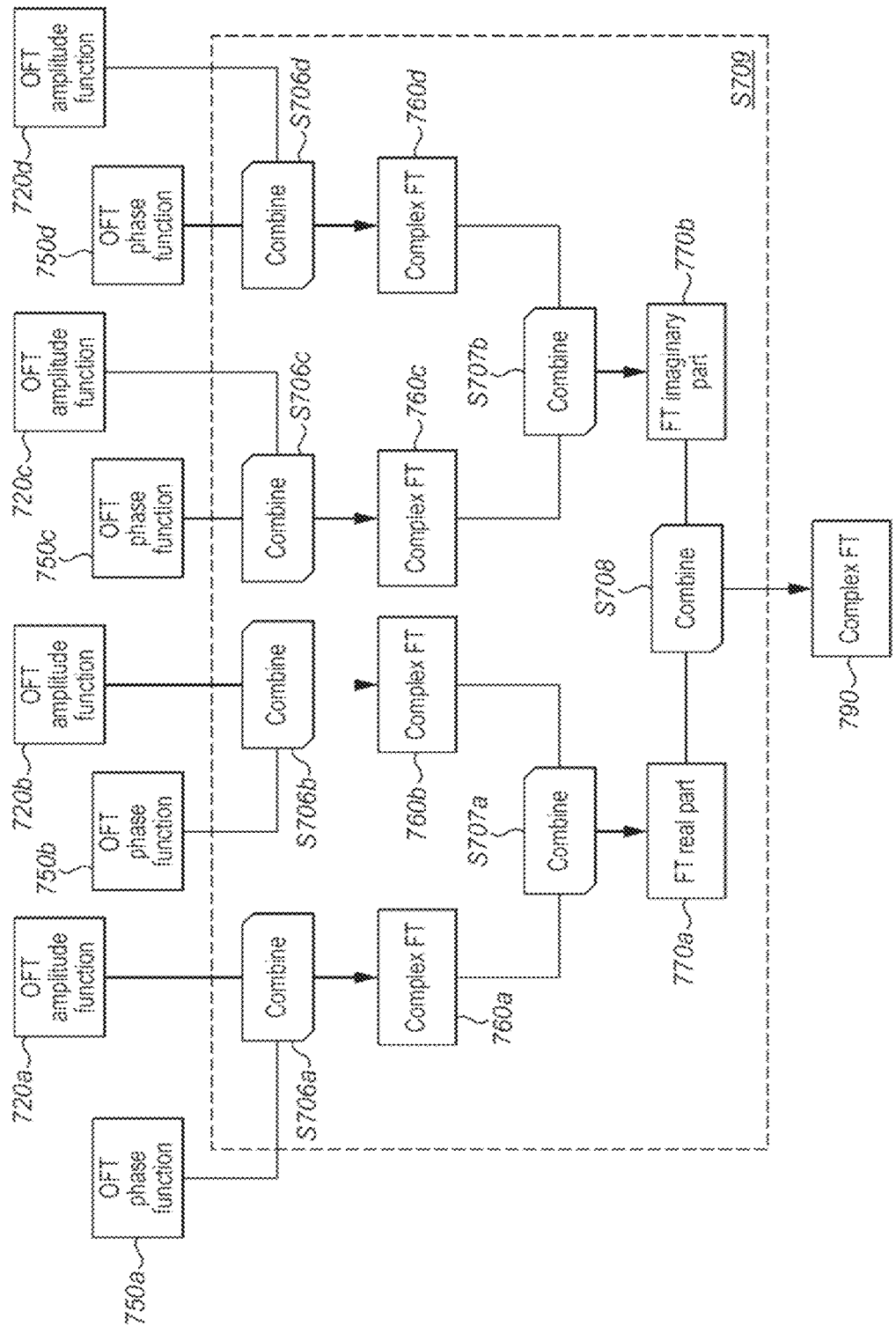
FIG. 10 shows a flow chart illustrating a method of combining the phase and amplitude functions of a series of optical Fourier transforms to form the real and imaginary part of a complex Fourier transform function.

The measured amplitude functions 720a-720d may be combined with the determined phase functions 750a-750d in step S709 in different ways. In embodiments, the complex Fourier transforms of real part 701 and the real component of the imaginary part 702 are found and then combined to form the complex Fourier transform 790 of the input function 700. FIG. 10 illustrates this method with a flow chart. FIG. 10 shows the measured amplitude functions 720a-720d and determined phase functions 750a-750d corresponding to each sub-function 710a-710d of FIG. 7 combined in steps S706a-S706d to form the complex Fourier transforms 760a-760d. The complex Fourier transforms, 760a and 760b are combined in step S707a to form the complex Fourier transform 770a of the real part 701 of the input function 700. The complex Fourier transforms, 760c and 760d are combined in step S707b to form the complex Fourier transform 770b of the imaginary part 702 of the input function 700.

There is therefore provided a step of combining the determined phase functions and measured amplitude functions which comprises adding together the respective complex Fourier transforms of the first plurality of sub-functions to form the real component of the Fourier transform of the input function; and adding together the respective complex Fourier transforms of the second plurality of sub-functions to form the imaginary component of the Fourier transform of the input function, wherein the real component of the Fourier transform of the input function and the imaginary component of the Fourier transform of the input function form the complex Fourier transform of the input function.

The inventors have recognized that the method of decomposing an input function into its real and imaginary parts, and combining the optical Fourier transforms of the real and imaginary parts to form the complex Fourier transform of the input function advantageously makes use of the linearity of Fourier transforms. This provides a resource efficient method for performing the Fourier transform of an input function.

Methods disclosed herein may be performed using the optical apparatus of FIG. 1.

There is therefore provided a method as described herein wherein the step of measuring the amplitude function of an optical Fourier transform of the sub-function comprises: displaying or representing the sub-function on a spatial light modulator; illuminating the spatial light modulator to form spatially modulated light; Fourier transforming the spatially modulated light using a Fourier transform lens; and detecting the spatial intensity distribution at the Fourier plane of the Fourier transform lens. There is also provided a step of square-rooting the detected spatial intensity distribution. There is further provided a step of detecting the spatial intensity distribution at the Fourier plane of the Fourier transform lens comprising detecting the spatial intensity distribution at the Fourier plane of the Fourier transform lens using a photodetector array.

It should be understood that, as explained earlier, the nature of the perturbation function is chosen based on the nature of the sub-function. In an embodiment, the perturbation function is a delta function. In an embodiment, the Fourier transform of the perturbation comprises an amplitude function and a phase function in which the phase is one of the plurality of possible phase values. In other embodiments, the perturbation function may be any arbitrary function. It may be understood that a method may be employed for determining what the Fourier transform of the perturbation function should be for any arbitrary perturbation function. In embodiments, a step of performing the Fourier transform of the perturbation function is carried out. The Fourier transform is then fed back automatically to allow calculation of the phase of the Fourier transform of the input function using the methods described herein. In embodiments, this step may be carried out independently of other steps of the method.

Some of the steps of the methods described herein may be carried out by computing means, some may be carried out by optical means and some may be carried out by both computing means and optical means. For example, the step S701 of decomposing the input function 700 and the step S709 of combining the measured amplitude functions 720a-720d with the determined phase functions 750a-750d may be carried out by computing means. Optical means may be used to perform the step S702a of optically Fourier transforming the sub-function 710a, the step S703a of perturbing the sub-function and the step S704a of optically Fourier transforming the perturbed sub-function 730a. Both optical and computing means are required to perform the step 705a of detecting changes in the measured amplitude function. It may be understood that the computing means and optical means therefore work together as a system to perform methods disclosed herein.

Advantageously, with currently available 8K spatial light modulators for display applications, a full optical Fourier transform could be performed in approximately 20 ms, compared with approximately 600 ms on a powerful digital computer (at the time of writing).

Further advantageously, as larger spatial light modulators become available, larger optical Fourier transforms can be performed with no time penalty. In addition, power savings from an optical system of this type are substantial. The spatial light modulators and light source (typically a low power laser) only require a few watts of power.

There is therefore provided a device for performing a complex Fourier transform of an input function comprising amplitude and phase information comprising: a processor arranged to decompose an input function into a plurality of sub-functions, wherein the Fourier transform of each sub-function comprises an amplitude function and a phase function in which the phase is constrained to a plurality of possible phase values; and an optical system arranged to measure the amplitude function of an optical Fourier transform of the sub-function and changes in the amplitude function of the optical Fourier transform caused by applying a perturbation function to the sub-function; wherein the processor is further arranged to: determine the phase function of the complex Fourier transform of each sub-function from the measured amplitude function of the optical Fourier transform of the sub-function and the measured changes in the amplitude function of the optical Fourier transform caused by applying a perturbation function to the sub-function; and combine the determined phase functions and the measured amplitude functions of optical Fourier transforms of the sub-functions to form the complex Fourier transform of the input function.

In embodiments, the optical system further comprises: a spatial light modulator arranged to display the sub-function; a light source arranged to illuminate the spatial light modulator to form spatially modulated light; a Fourier transform lens arranged to receive the spatially modulated light and Fourier transform the spatially modulated light; a photodetector array arranged to detect the spatial intensity distribution at the Fourier plane of the Fourier transform lens.

In an embodiment, the spatial light modulator and the Fourier transform lens are separated by a distance equal to the focal length of the Fourier transform lens and the Fourier transform lens and the photodetector array are separated by a distance equal to the focal length of the Fourier transform lens.

In embodiments, the SLM is driven by signals which are DC balanced. DC balancing is attractive as an additional part of the methods described herein. If a signal is not DC balanced, the DC term in the optical Fourier transform can be much brighter than the rest of the transform, making it hard to record the optical Fourier transform on a system with a given dynamic range. The odd component o(x) is inherently DC balanced. In embodiments, the even component is shifted so that $e_{bal}(x)=e(x)-\langle e(x)\rangle$ is also DC balanced. In embodiments, this adjustment is compensated for in the optical Fourier transform by changing the DC offset appropriately.

A requirement of the methods described herein is obtaining the appropriate optical modulation. In order to display o(x) and $e_{bal}(x)$ (wherein $e_{bal}(x)$ is a DC balanced form of e(x)) it is necessary to be able to display positive and negative numbers. That is, the SLM needs to be able to display continuous amplitude and constrained phase—in embodiments, binary phase such as ($\{0, \pi\}$)—as represented by the first function 315 in FIG. 3. In other embodiments, it may also be necessary to display continuous amplitude and binary phase plus an additional π/2 out of phase point.

It may be understood that this could be achieved in a number of ways and the present disclosure is not therefore limited to the examples given in the following. In embodiment, a two-pass modulation setup is used where two separate SLMs are used to achieve the correct modulation. The SLMs could be arranged in either a series or a parallel arrangement. Examples of such arrangements are shown in FIGS. 11-13.

Figure 11:
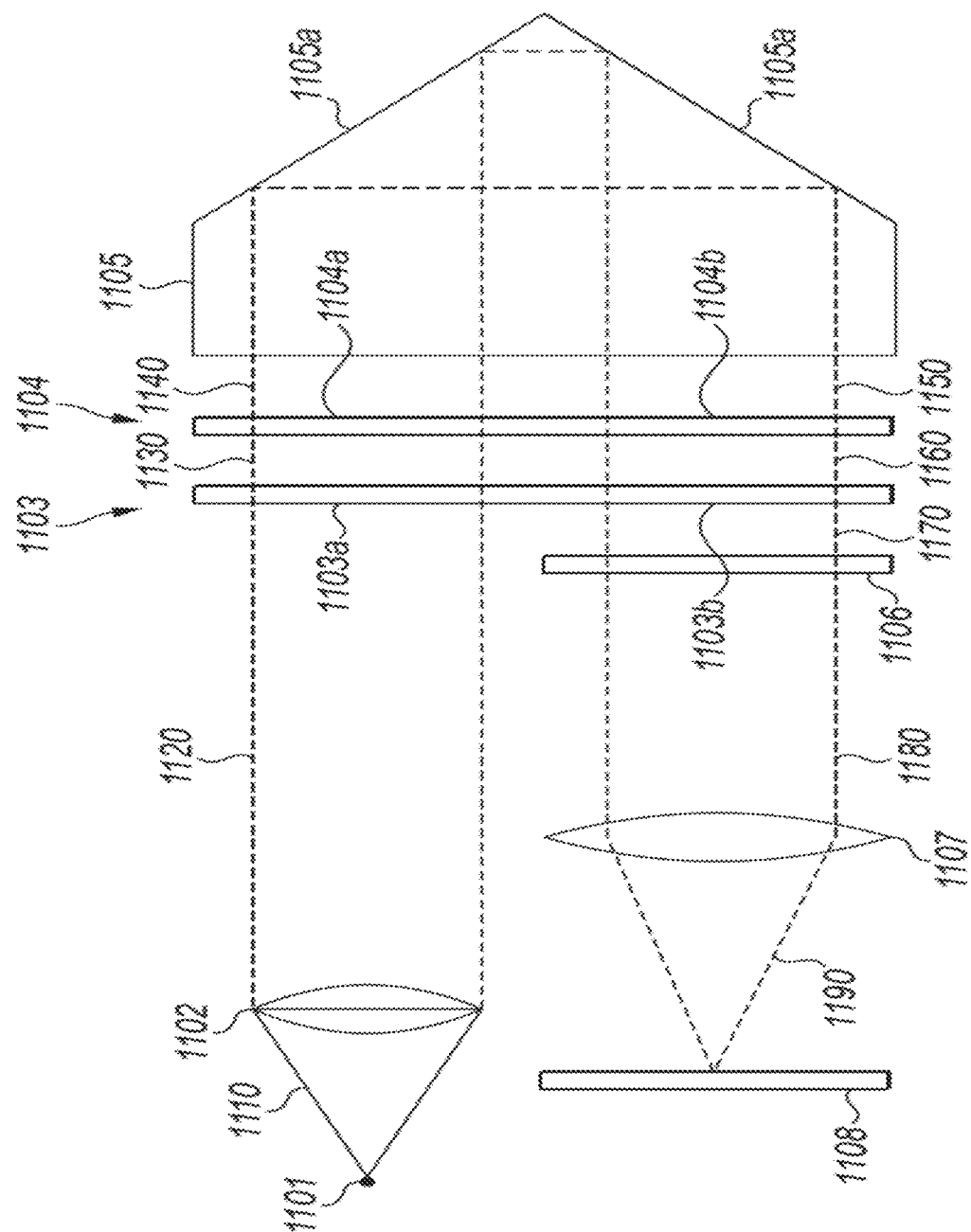
FIG. 11 shows a first example of an optical system suitable for achieving full complex modulation with a transmissive SLM.

FIG. 11 shows an embodiment which includes a converging lens 1102 arranged to receive diverging light 1110 from a light source 1101; an SLM 1103 arranged to receive collimated light 1120 from the collimating lens 1102 at a first SLM portion 1103a of the SLM 1103; a half wave plate 1104 arranged to receive modulated light 1130 from the first SLM portion 1103a at a first plate portion 1104a of the quarter wave plate 1104; and a pentaprism 1105 arranged to receive phase shifted light 1140 at a first pentaprism surface 1105a from the first plate portion 1104a. The first pentaprism surface 1105a is arranged to reflect the phase shifted light 1140 through 90 degrees towards a second pentaprism surface 1105b arranged to reflect the phase shifted light 1140 through another 90 degrees and toward a second plate portion 1104b of the half wave plate 1104. The SLM 1103 is further arranged to receive phase double shifted light 1160 from the second plate portion 1104b at a second SLM portion 1103b of the SLM 1103. FIG. 11 further shows a polariser 1106 arranged to receive doubly modulated light 1170 from the second SLM portion 1103b; a Fourier transform lens 1107 arranged to receive polarisation selected light 1180 from the polariser 1106 and a photodetector 1108 arranged to receive Fourier transformed light 1190 from the Fourier transform lens 1107. The converging lens 1102, first SLM portion 1103a, first plate portion 1104a, and first pentaprism surface 1105a are arranged along a first optical axis (not shown) and the second pentaprism surface 1105a, second plate portion 1104a, second SLM portion 1103a, polariser 1106, Fourier transform lens 1107 and photodetector array 1108 are arranged along a second optical axis (also not shown) which lies parallel to the first optical axis.

In operation, the collimated light 1120 is modulated by the first SLM portion 1103a such that it has a first polarisation profile. The polarisation of the modulated light 1130 is rotated twice, once by the first plate portion 1104a and once by the second plate portion 1104b. The phase double shifted light 1160 is given a second polarisation profile by the second SLM portion 1103b. The polariser 1106 then selects the appropriate polarisation states from the doubly modulated light 1170 to form polarisation selected light 1180, which has the amplitude profile of the intended function or perturbed function. The polarisation selected light 1180 is then Fourier transformed by the Fourier transform lens 1107 and the optical Fourier transform of the function or perturbed function is detected by the photodetector array 1108. It may be understood that the phase shift at the first plate portion 1104a and the second plate portion 1104b depends on the polarisation state, which may have been modulated by the SLM. Hence the shift which occurs at the first plate portion 1104a is not necessarily the same as the shift which occurs at the second plate portion.

Figure 12:
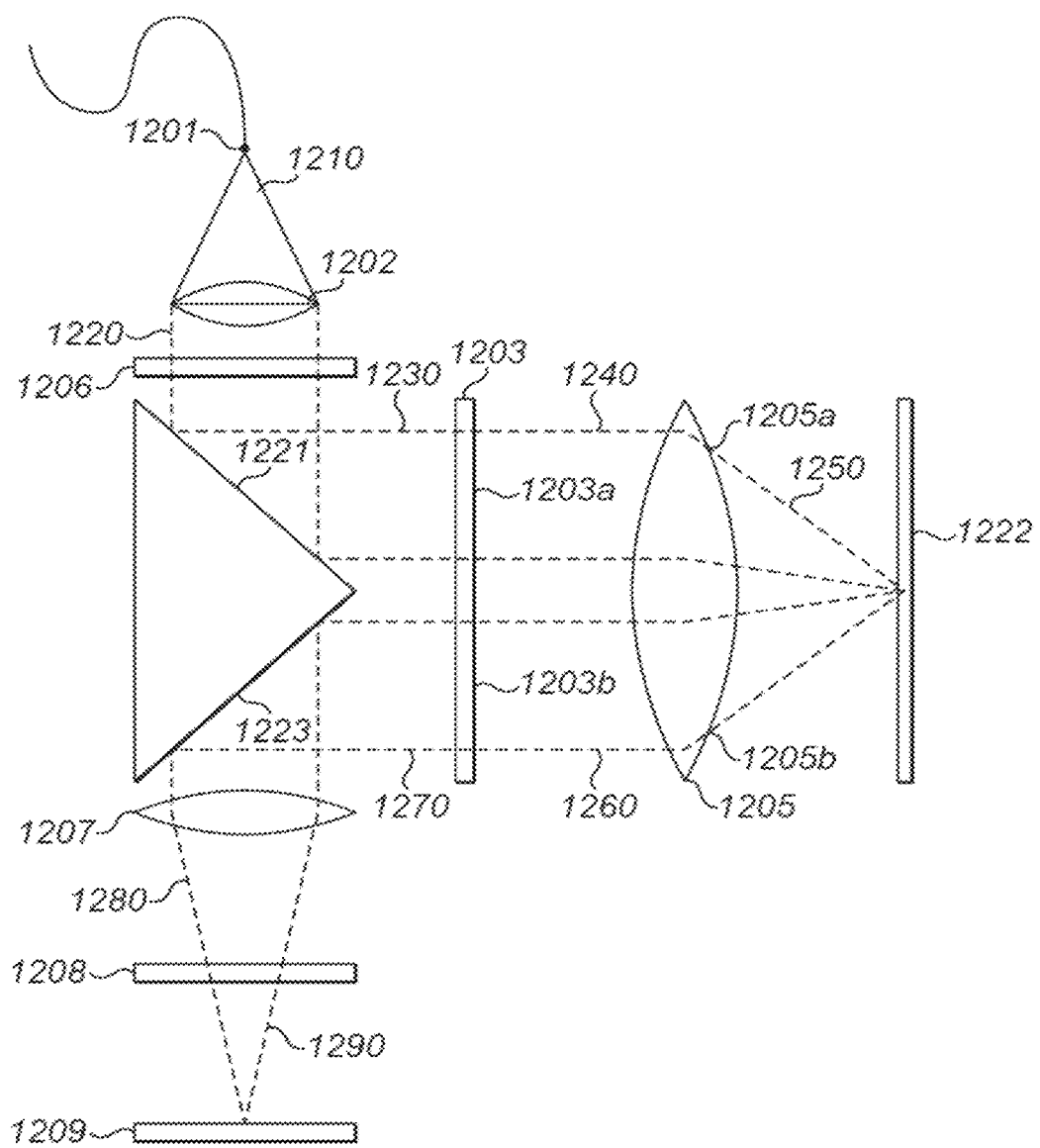
FIG. 12 shows a second example of an optical system suitable for achieving full complex modulation with a transmissive SLM.
Figure 13:
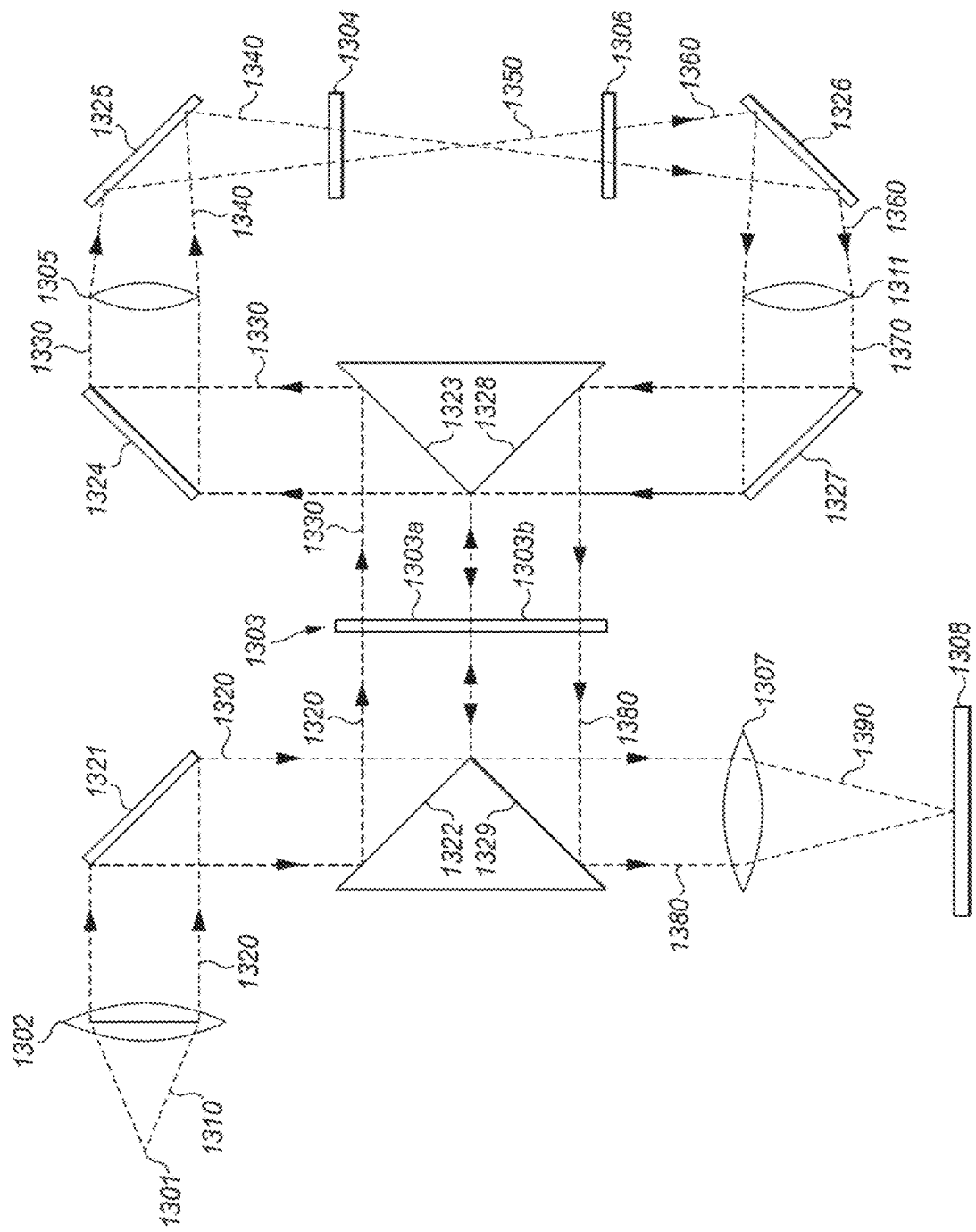
FIG. 13 shows a third example of an optical system suitable for achieving full complex modulation with a transmissive SLM.

FIG. 12 shows an alternative embodiment which includes a converging lens 1202 arranged to receive diverging light 1210 from a light source 1201, a first polariser 1206 arranged to receive collimated light 1220 from the converging lens 1202, an SLM 1203 arranged to receive polarised light 1230 from the first polariser 1206 at a first SLM portion 1203a via a first mirror 1221, and an inverting lens 1205 arranged to receive modulated light 1240 from the first SLM portion 1203a at a first lens portion 1205a. A second mirror 1222 is arranged to receive inverted light 1250 from the first lens portion 1205a and relay it towards a second lens portion 1205b of the inverting lens 1205. A second SLM portion 1203b of the SLM 1203 is arranged to receive relayed light 1260 from the second lens portion 1205a. A Fourier transform lens 1207 is arranged to receive doubly modulated light 1270 from the second SLM portion 1203b via a third mirror 1223, a second polariser 1208 is arranged to receive transformed light 1280 from the Fourier transform lens 1207 and a photodetector array 1209 is arranged to receive polarisation selected light 1290 from the second polariser. It may be understood that, in embodiments, the degrees and angles of the waveplates are selected appropriately according to the modulation characteristics of the SLM used.

In operation, the first polariser 1206 polarises the collimated light 1220. The polarised light 1230 is modulated by the first SLM portion 1203a to provide modulated light 1240 with a first polarisation profile. The first lens portion 1205a, the second mirror 1222 and the second lens portion 1205b optically relay the modulated light 1240 to allow it to pass through the second SLM portion 1203b. The optically relayed light 1260 is modulated further by the second SLM portion 1203b and the double modulated light 1270 from the second SLM portion 1203*b* possessing the amplitude profile of the intended function or perturbed function is then Fourier transformed by the Fourier transform lens 1207. The polariser 1206 then selects the appropriate polarisation states to form polarisation selected light 1280, which has an amplitude and phase profile. The polarisation selected light 1280 is then detected by the photodetector array 1208. In this embodiment, the SLM type is chosen such that wave plates are not needed to achieve the appropriate amplitude and phase modulation.

FIG. 13 shows a further embodiment which includes a converging lens 1302 arranged to receive diverging light 1310 from a light source 1301 and a series of mirrored surfaces 1321-1329 arranged to direct light along an optical path passing through a series of optical components. The optical components include: an SLM 1303 arranged to receive collimated light 1320 from the converging lens 1302 at a first SLM portion 1303*a* of the SLM 1303; an inverting lens 1305 arranged to receive modulated light 1330 from the first SLM portion 1303*a*; a half wave plate 1304 arranged to receive inverted light 1340 from the inverting lens and a polariser 1306 arranged to receive phase shifted light 1350 from the half wave plate 1304. Polarised light 1360 from the polariser 1306 is received by a collimating lens 1311. Collimated, polarisation selected light 1370 is received at a second SLM portion 1303*b* of the SLM 1303. A Fourier transform lens 1307 is arranged to receive double modulated light 1380 from the second SLM portion 1303*b* and a photodetector 1308 is arranged to receive Fourier transformed light 1390 from the Fourier transform lens 1307. It may be understood that, in other embodiments, the waveplates and polarisers may be placed anywhere in the optical path, such as at locations other than those shown in FIG. 13.

In operation, the collimated light 1320 is given a first polarisation profile by the first SLM portion 1303*a*. The inverting lens 1305 and collimating lens 1311 form an optical relay in which the half wave plate 1304 and polariser 1306 are contained. The polarisation of the modulated light 1330 is rotated by the half wave plate 1304, and the polariser 1306 then selects the appropriate polarisation states from the combination of the first polarisation profile to form polarisation selected light 1370, which has a first amplitude profile. The double modulated light 1380 provided by the second SLM portion 1303*b* has a second amplitude profile, which is that of the intended function or perturbed function. The double modulated light 1380 is then Fourier transformed by the Fourier transform lens 1307 and the optical Fourier transform of the function or perturbed function is detected by the photodetector array 1308.

As well as the architectures shown in FIGS. 11, 12, and 13, implementations using reflective SLMs, such as a LCOS (Liquid Crystal on Silicon) SLM, are possible. LCOS represents the state-of-the-art in SLM technology. It consists of a silicon backplane with reflective electrodes forming the back surface of a liquid crystal cell, the front surface being a transparent electrode. The effect is to modulate either phase or, more generally polarisation as the light passes twice through the liquid crystal layer.

Figure 14:
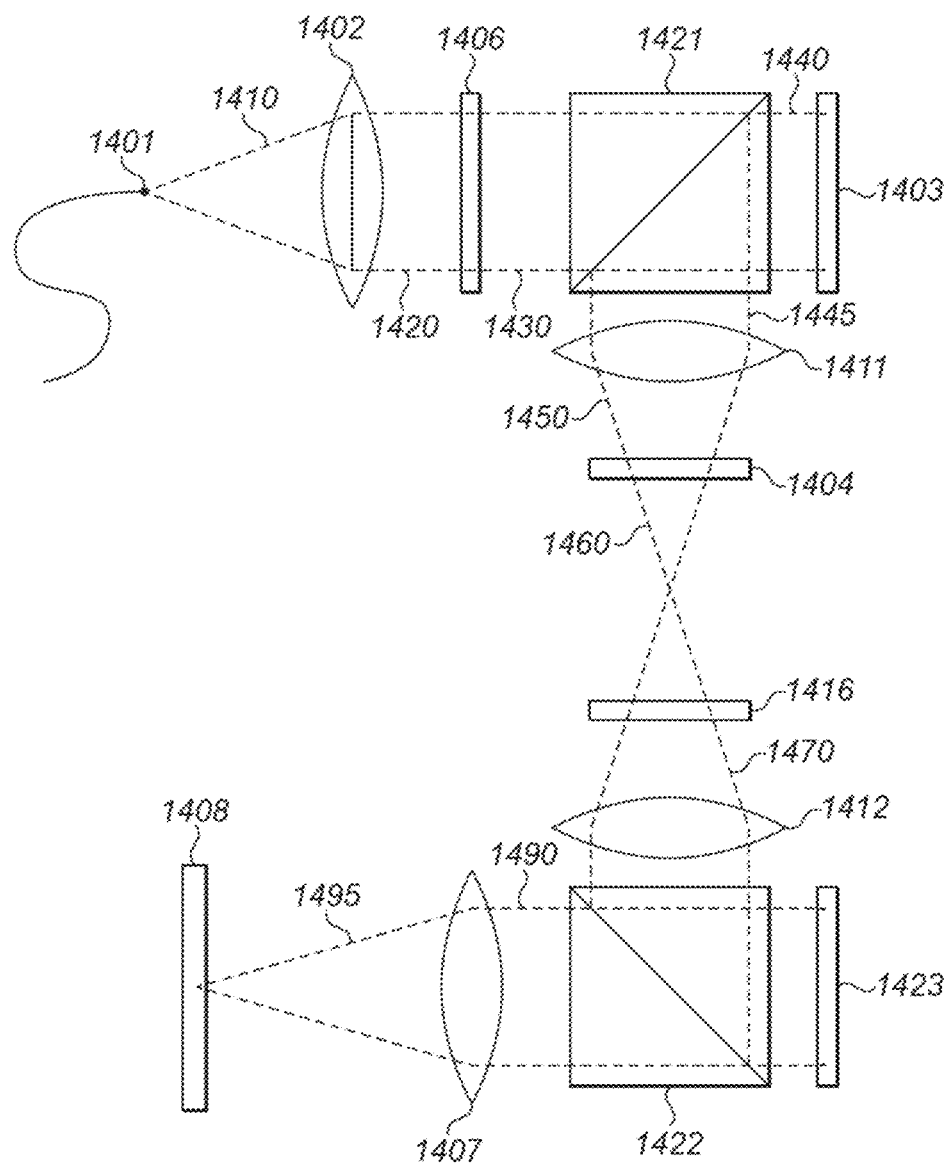
FIG. 14 shows a first example of an optical system suitable for achieving full complex modulation with two reflective SLMs.
Figure 15:
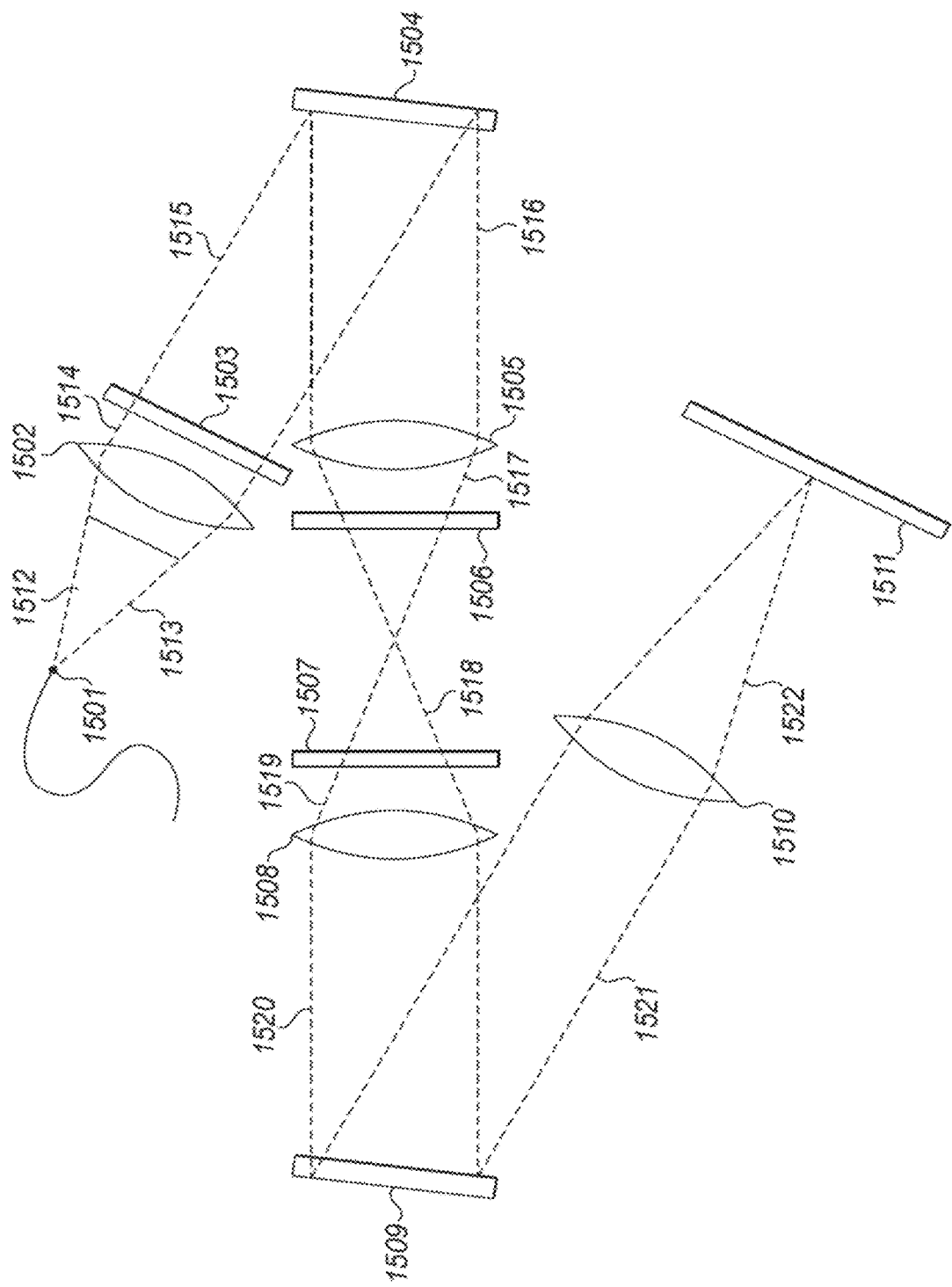
FIG. 15 shows a second example of an optical system suitable for achieving full complex modulation with two reflective SLMs.

Examples of architectures having reflective SLMs are shown in FIGS. 14 and 15.

FIG. 14 shows a further embodiment which includes a converging lens 1402 arranged to receive diverging light 1410 from a light source 1401. There is further included: a first polariser 1406 arranged to receive collimated light 1420 from the converging lens 1402; a first beam splitter 1421 arranged to receive polarised light 1430 from the first polariser 1406; a first SLM 1403 arranged to receive split light 1440 from the first beam splitter 1421; an inverting lens 1411 arranged to receive modulated light 1445 from the first SLM 1403 via the first beam splitter 1421; a wave plate 1404 arranged to receive converging light 1450 from the inverting lens 1411; and a second polariser 1416 arranged to receive phase shifted light 1460 from the wave plate 1404. Inverted light 1470 from the second polariser 1406 is received by a collimating lens 1412 and then received at a second SLM 1423 via a second beam splitter 1422. A Fourier transform lens 1407 is arranged to receive double modulated light 1490 from the second SLM via the second beam splitter 1422 and a photodetector 1408 is arranged to receive Fourier transformed light 1495 from the Fourier transform lens 1407.

In operation, the collimated light 1420 is given a first polarisation profile by the first SLM 1403. The inverting lens 1411 and collimating lens 1412 form an optical relay in which the wave plate 1404 and second polariser 1416 are contained. The polarisation of the modulated light 1445 is rotated by the wave plate 1404, and the second polariser 1416 then selects the appropriate polarisation states from the combination of the first polarisation profile to form polarisation selected light 1470, which has a first amplitude profile. The double modulated light 1490 provided by the second SLM 1423 has a second amplitude profile, which is that of the intended function or perturbed function. The double modulated light 1490 is then Fourier transformed by the Fourier transform lens 1407 and the optical Fourier transform of the function or perturbed function is detected by the photodetector array 1408. It may be understood that the first and second beam splitters 1421, 1422 take some of the modulated light 1445 off on a different optical path. The first and second beam splitters 1421, 1422 could be of a polarising or non-polarising type. Only the relevant optical paths are shown in FIG. 14; in reality light potentially travels down two paths after each interaction with each of the first and second beam splitters 1421, 1422. It may be understood that the first and second beam splitters and first and second SLMs could be orientated differently, for example, the first SLM 1403 could be positioned on the vacant face of the first beam splitter 1421.

FIG. 15 shows a further embodiment which includes a converging lens 1502 arranged to receive diverging light 1513 from a light source 1501. There is further included: a first wave plate 1503 arranged to receive collimated light 1514 from the converging lens 1502; a first SLM 1403 arranged at a slight angle to receive phase shifted light 1515 from the first wave plate 1503; an inverting lens 1505 arranged to receive modulated light 1516 from the first SLM 1504; a second wave plate 1506 arranged to receive inverted light 1517 from the inverting lens 1505; and a polariser 1507 arranged to receive phase double shifted light 1518 from the second wave plate 1506. Polarised light 1519 from the polariser 1507 is received by a collimating lens 1508. Collimated, polarised light 1520 is received at a second SLM 1509 at a slight angle. A Fourier transform lens 1510 is arranged to receive double modulated light 1521 from the second SLM via and a photodetector 1511 is arranged to receive Fourier transformed light 1522 from the Fourier transform lens 1510.

In operation, the collimated light 1514 is given a first polarisation profile by the first SLM. The inverting lens 1505 and collimating lens 1508 form an optical relay in which the second wave plate 1506 and polariser 1507 are contained. The polarisation of the modulated light 1516 is rotated by the second wave plate 1506, and the polariser 1507 then selects the appropriate polarisation states from the first polarisation profile to form polarisation selected light 1519, which has a first amplitude profile. The double modulated light 1521 provided by the second SLM 1509 has a second amplitude profile, which is that of the intended function or perturbed function. The double modulated light 1521 is then Fourier transformed by the Fourier transform lens 1510 and the optical Fourier transform of the function or perturbed function is detected by the photodetector array 1511.

Figure 16:
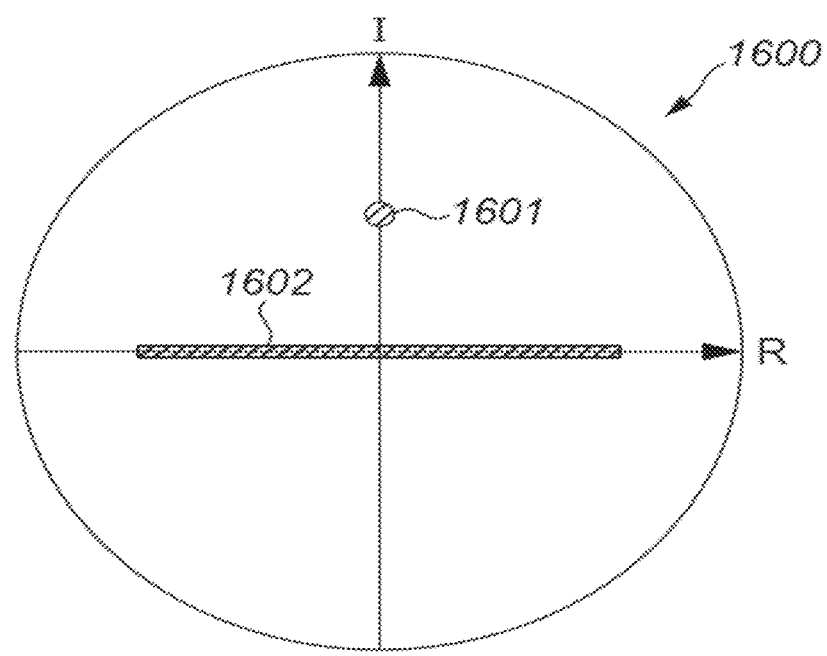
FIG. 16 shows an Argand diagram with continuous modulation in the real axis and an out of phase point on the imaginary axis.

The apparatuses in FIGS. 11-15 provide continuous amplitude and binary phase modulation for a real function to be displayed on the SLM. In embodiments using a perturbation for an odd function, the SLM also needs to be able to display a single out of phase point as shown in FIG. 16.

This modulation capability can be represented on an Argand diagram. FIG. 16 shows an Argand diagram 1600 representing possible values on a sub-function or input function. A thick line 1602 lying on the real axis of the Argand diagram 1600 represents the continuous amplitude and binary phase for a real function and a single point 1601 on the positive imaginary axis represents the out of phase point of a perturbation function.

It is possible to fulfil this criterion using an appropriate algorithm to select the SLMs and the placement and type of the wave plates and polarisers in the design of any of the embodiments shown in FIGS. 11-15. In each of the embodiments described, the type of modulation provided by the first SLM portion and second SLM portion along with the choice and placement of the wave plate(s) and polariser(s) determines the possible output states of the system—indeed the waveplates and polarisers may not be required depending on the modulation offered by the SLM. In embodiments, these parameters are determined by the use of an algorithm which takes into account the Jones Matrix corresponding to each state. The Jones Matrix is a way of representing a birefringent optical material. The output states of the system offer a set (or subset) of states on a line as in FIG. 3 or FIG. 4 plus a point which is $\pi/2$ out of phase with the points on the line, as shown in FIG. 16. This line could be on any arbitrary axis—the real axis and imaginary axis, in essence, are arbitrary choices as they are each linked to all other axes by a global phase change.

The complex Fourier transform output of input functions provided by disclosed methods and optical systems have a wide variety of applications that can all benefit from the specific improvements to signal processing by computer-related technology that is provided, which provides operation beyond the of use of a computer in its ordinary signal processing capacity. Disclosed improvements are at least one of superior speed and higher energy efficiency. Such applications include fields such as data processing, image processing, scientific computing, and numerical simulations. In the specific field of numerical weather prediction it is advantageous to transform data from the spatial domain into the frequency domain, and back again, via a Fourier transform operation. The purpose of this transform for weather prediction is to facilitate the more accurate calculation of physical quantities required by the weather simulation. In particular, frequency-domain (spectral) methods provide for a more accurate determination of derivatives. A disclosed hardware-based optical system can be used to replace the Fourier transform algorithms presently implemented by software.

Those skilled in the art to which this Disclosure relates will appreciate that many other embodiments and variations of embodiments are possible within the scope of the claimed invention, and further additions, deletions, substitutions and modifications may be made to the described embodiments without departing from the scope of this Disclosure.

The invention claimed is:

1. A method of performing a complex Fourier transform of an input function comprising amplitude and phase information, comprising: decomposing the input function into a plurality of sub-functions with a processor, wherein the complex Fourier transform of each of the sub-functions comprises an amplitude function and a phase function in which a phase of the phase function is constrained to a plurality of possible phase values; determining, with the processor, the phase function of the Fourier transform of each of the sub-functions with an optical system that measures the amplitude function of an optical Fourier transform of each of the sub-functions and changes in the amplitude function of the complex Fourier transform caused by applying a perturbation function to the sub-function, and combining, with the processor, the determined phase functions and the measured amplitude functions for each of the sub-functions to form the complex Fourier transform of the input function.

2. The method claim 1, wherein the step of decomposing the input function into the plurality of sub-functions comprises:
   determining a real component and an imaginary component of the input function;
   decomposing the real component of the input function into a first plurality of sub-functions;
   decomposing the imaginary component of the input function into a second plurality of sub-functions.

3. The method claim 1, wherein the step of measuring changes in the amplitude function comprises:
   adding the perturbation function to the sub-function to form a perturbed sub-function;
   performing an optical Fourier transform of the perturbed sub-function and detecting an amplitude function of the Fourier transform of the perturbed sub-function; and
   comparing the measured amplitude function of the Fourier transform of the sub-function to the amplitude function of the Fourier transform of the perturbed sub-function.

4. The method of claim 1, wherein the phase of the phase function constrained to two of the possible phase values, and wherein a difference between the two possible phase values for at least one of the sub-functions is $(2n+1)\pi$ radians, where n is an integer.

5. The method of claim 4, wherein a first of the plurality of sub-functions is a first even function and a first odd function, and wherein a second of the plurality of sub-functions is a second even function and a second odd function.

6. The method of claim 1, wherein the complex Fourier transform of the sub-function is a pixelated representation of the complex Fourier transform of the sub-function comprising a spatial array of elements, wherein each of the elements comprise an amplitude value and a phase value.

7. The method of claim 1, further comprising forming the complex Fourier transform of each of the sub-functions using the determined phase function and measured amplitude function for each of the sub-functions.

8. The method of claim 1, wherein the step of combining the determined phase functions and measured amplitude functions comprises:
   adding together the respective complex Fourier transforms of a first of the plurality of sub-functions to form the Fourier transform of a real component of the input function; and adding together the respective complex Fourier transforms of a second of the plurality of sub-functions to form the Fourier transform of an imaginary component of the input function,
wherein the Fourier transform of the real component of the input function and the Fourier transform of the imaginary component of the input function form the complex Fourier transform of the input function.

9. The method of claim 1, wherein the changes in the amplitude function of the optical Fourier transform caused by applying the perturbation function to the sub-function to generate a perturbed sub-function are determined by subtracting the measured amplitude function of the Fourier transform of the sub-function from the amplitude function of the Fourier transform of the perturbed sub-function to form a difference function.

10. The method of claim 9, further comprising determining a sign of the difference function.

11. The method of claim 1, wherein the step of measuring the amplitude function of the optical Fourier transform of the sub-function comprises:
representing the sub-function on a spatial light modulator;
illuminating the spatial light modulator to form spatially modulated light;
Fourier transforming the spatially modulated light using a Fourier transform lens; and
detecting a spatial intensity distribution at the Fourier plane of the Fourier transform lens, or
representing the sub-function on the spatial light modulator;
illuminating the spatial light modulator to form the spatially modulated light; and
detecting the spatial intensity distribution in an optical far field.

12. The method of claim 11, further comprising square-rooting the spatial intensity distribution.

13. The method of claim 11, wherein the step of detecting the spatial intensity distribution comprises detecting the spatial intensity distribution using a photodetector array.

14. The method of claim 1, wherein the perturbation function is a delta function or a discrete approximation of the delta function.

15. The method of claim 1, wherein the Fourier transform of the perturbation function comprises the amplitude function wherein the phase of the phase is one of the plurality of possible phase values.

16. A device for performing a complex Fourier transform of an input function comprising amplitude and phase information, comprising:
a processor arranged to decompose the input function into a plurality of sub-functions, wherein the complex Fourier transform of each of the sub-functions comprise an amplitude function and a phase function in which a phase is constrained to a plurality of possible phase values; and
an optical system arranged to measure, for each of the sub-functions the amplitude function of an optical Fourier transform of the sub-function and changes in the amplitude function of the optical Fourier transform caused by applying a perturbation function to the sub-function;
wherein the processor is further arranged to:
determine, for each of the sub-functions the phase function of the complex Fourier transform of the sub-function from the amplitude function of the optical Fourier transform of the sub-function and the changes in the amplitude function of the optical Fourier transform caused by applying the perturbation function to the sub-function; and
combine the phase functions and the amplitude functions of the optical Fourier transforms of each of the sub-functions to form the complex Fourier transform of the input function.

17. The device of claim 16, wherein the optical system further comprises:
a spatial light modulator arranged to display each of the sub-functions;
a light source arranged to illuminate the spatial light modulator to form spatially modulated light;
a Fourier transform lens arranged to receive the spatially modulated light and Fourier transform the spatially modulated light, and
a photodetector array arranged to detect a spatial intensity distribution at a Fourier plane of the Fourier transform lens.

18. The device of claim 16, wherein the optical system further comprises:
a spatial light modulator arranged to display each of the sub-functions;
a light source arranged to illuminate the spatial light modulator to form spatially modulated light;
a photodetector array arranged to detect a spatial intensity distribution in the optical far field.

19. The device of claim 18, wherein the spatial light modulator comprises a plurality of the spatial light modulators for the device to provide a parallel measurement arrangement.

20. The device of claim 18, wherein the spatial light modulator consists of an only modulator for the device to provide a series measurement arrangement.

21. The device of claim 17, wherein the spatial light modulator comprises a plurality of the spatial light modulators for the device to provide a parallel measurement arrangement.

22. The device of claim 17, wherein the spatial light modulator consists of an only modulator for the device to provide a series measurement arrangement.

* * * * *